(12) United States Patent
Chaves et al.

(10) Patent No.: US 10,317,606 B2
(45) Date of Patent: Jun. 11, 2019

(54) ÉTENDUE-SQUEEZING LIGHT INJECTOR AND APPARATUS

(71) Applicant: LIGHT PRESCRIPTIONS INNOVATORS, LLC, Altadena, CA (US)

(72) Inventors: Julio C Chaves, Coimbra (PT); Pablo Benitez, Madrid (ES); Juan Carlos Minano, Madrid (ES); Waqidi Falicoff, Talent, OR (US)

(73) Assignee: Light Prescriptions Innovators, LLC, Altadena, CA (US)

( * ) Notice: Subject to any disclaimer, the term of this patent is extended or adjusted under 35 U.S.C. 154(b) by 53 days.

(21) Appl. No.: 15/534,088

(22) PCT Filed: Dec. 10, 2015

(86) PCT No.: PCT/US2015/064968
§ 371 (c)(1),
(2) Date: Jun. 8, 2017

(87) PCT Pub. No.: WO2016/094644
PCT Pub. Date: Jun. 16, 2016

(65) Prior Publication Data
US 2018/0313995 A1     Nov. 1, 2018

Related U.S. Application Data

(60) Provisional application No. 62/124,236, filed on Dec. 11, 2014, provisional application No. 62/282,672, filed on Aug. 6, 2015.

(51) Int. Cl.
*H05K 5/00*     (2006.01)
*F21V 8/00*     (2006.01)
*G09G 3/34*     (2006.01)

(52) U.S. Cl.
CPC .......... *G02B 6/0028* (2013.01); *G02B 6/0066* (2013.01); *G09G 3/3406* (2013.01)

(58) Field of Classification Search
CPC .......................... G02B 6/0028; G02B 6/0023
USPC ........ 362/610, 606, 611, 612, 628, 615, 616
See application file for complete search history.

(56) References Cited

U.S. PATENT DOCUMENTS

| | | | |
|---|---|---|---|
| 9,170,351 B2 | 10/2015 | Natsumeda et al. | |
| 2003/0095417 A1* | 5/2003 | Keuper ................ | G02B 6/0028 362/561 |
| 2006/0044831 A1* | 3/2006 | Yu ........................ | G02B 6/0016 362/615 |

(Continued)

OTHER PUBLICATIONS

International Search Report, and the Written Opinion of the International Searching Authority, of International Application No. PCT/US2015/064968, filed Dec. 10, 2015.

*Primary Examiner* — Laura K Tso
(74) *Attorney, Agent, or Firm* — Drinker Biddle & Reath LLP

(57) ABSTRACT

An etendue squeezing optic includes light guiding elements that are extruded sideways to guide light to a wide outlet surface for efficient injection into an edge face of a flat light guide such as a backlight panel for a visual display, in combination with a light source optically coupled to the light inlet through an air-gap, so that light entering the optic through the air-gap is confined to a cone of directions determined by a critical angle of refraction into the optic from air at the air-gap.

21 Claims, 23 Drawing Sheets

(56) References Cited

U.S. PATENT DOCUMENTS

| | | |
|---|---|---|
| 2008/0170296 A1 | 7/2008 | Chaves et al. |
| 2009/0167651 A1 | 7/2009 | Minano et al. |
| 2010/0118276 A1 | 5/2010 | Li |
| 2010/0195019 A1* | 8/2010 | Shinohara ............ G02B 6/0016 349/62 |
| 2011/0205759 A1* | 8/2011 | Kurata ................. G02B 6/0016 362/611 |
| 2013/0044514 A1* | 2/2013 | Chang .................. G02B 6/0028 362/609 |
| 2013/0250573 A1 | 9/2013 | Taskar et al. |
| 2014/0139809 A1 | 5/2014 | Natsumeda et al. |
| 2014/0176873 A1* | 6/2014 | Shinohara ............ G02B 6/0016 349/65 |
| 2015/0293289 A1* | 10/2015 | Shinohara ............. G02B 6/002 349/65 |

* cited by examiner

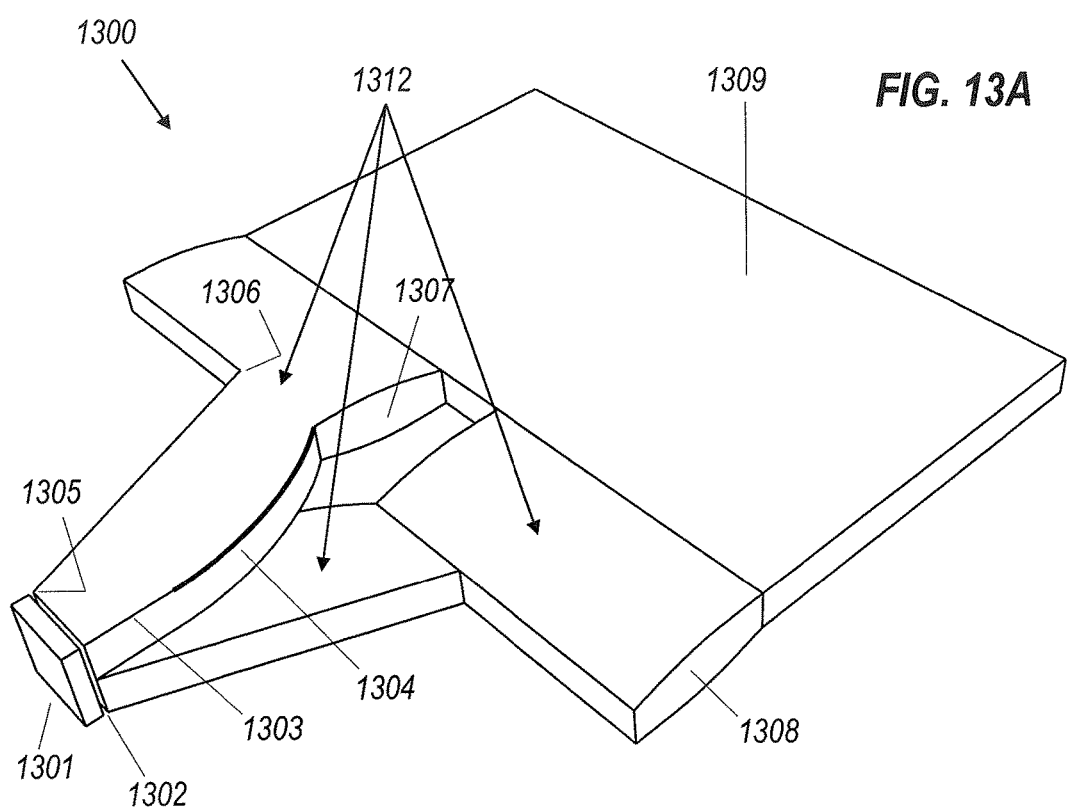

ÉTENDUE-SQUEEZING LIGHT INJECTOR AND APPARATUS

CROSS REFERENCE TO RELATED APPLICATIONS

This application claims benefit of provisional application 62/124,236, filed Dec. 11, 2014, and 62/282,672, filed Aug. 6, 2015, both by Chaves et al, both titled ÉTENDUE-SQUEEZING LIGHT INJECTOR AND APPARATUS. Both of those applications are hereby fully incorporated herein by reference.

BACKGROUND OF THE INVENTION

Many types of visual display in current use rely on transmitted or reflected light to produce a visible image. Such displays are frequently provided with a "backlight" or "frontlight" which is a flat device, laid close and parallel to the actual display, that emits light into the display over its area. In many designs, the light is injected into one or more edges of the flat element of the backlight or frontlight, and the backlight or frontlight then acts a distributor.

There is currently a desire to produce thinner backlights and frontlights so that the devices that include and use these components can be as thin and lightweight as possible. This is particularly true for smartphones and tablets both of which make extensive use of such components. Further requirements for these components include: low cost; the ability be manufactured in high volume; and high optical efficiency. Although thin backlights (approximately 0.25 mm thick) have already been produced, there is then the problem of how to inject light from certain type of sources, such as light-emitting diodes (LEDs), into the "main" light-distribution and emission element of a backlight or frontlight. In particular, there is a problem of efficiently injecting light from such sources where the minimum dimension of the source is larger than the thickness of the "main" backlight or frontlight element. The minimum width of current LED sources is about 0.6 mm, which is over twice the thickness of the thinnest current thin backlights.

Several solutions to that problem are taught in U.S. Pat. No. 7,286,296 B2 and U.S. Pat. No. 7,755,838 B2 (by several of the same inventors as the present application), first published on Nov. 3, 2005 as US 2005/0243570 A, where there are optical embodiments that transform the shape of a source, such as a square, to another shape, such as a rectangle, but with the latter having a smaller dimension in one direction than before but with substantially the same area as the source. That prior art teaches using a combination of elements (luminance shifters and light guides) to create so-called étendue squeezers, which can, within certain limits, be used to inject substantially all the light from a source into a backlight when the minimum dimension of the source is larger than the thickness of the backlight. Additional information is found in Julio Chaves, Waqidi Falicoff, Oliver Dross, Juan Carlos Mitiano, Pablo Benitez, William A. Parkyn, "Combination of light sources and light distribution using manifold optics", Proc. SPIE 6338, Nonimaging Optics and Efficient Illumination Systems III, 63380M (Sep. 11, 2006). In the interests of conciseness, information that is already known to persons skilled in the art through those and other publications is not unnecessarily repeated herein.

There are certain features of the approach that we taught in that prior art that are not always advantageous in every use. Firstly, the parts of those devices were envisioned to be made individually and then aligned and assembled together. They were not necessarily designed to be molded as one piece (even though one-piece molding may be possible using sophisticated molding techniques and in some assemblages more than one material). Secondly, the optical approach in that prior art conserves étendue while ensuring that the source area at the entry port is substantially the same at the exit port. Étendue conservation may not be the most appropriate approach if the goal is to fully flash a backlight of the solid dielectric type without having dark regions near the exit port or ports. The beam cone angle at the exit aperture of the étendue-squeezing optic into a solid dielectric backlight optic is limited by the critical angle related to the index of refraction of the material. It may be desirable to have a solid dielectric étendue squeezer which can be easily moldable as one part and which outputs a beam angle into a solid dielectric backlight optic that is equal to or wider in one direction than the one limited by the critical angle.

For some applications it would be desirable that the étendue-squeezed output has a larger area than the source at its exit to facilitate complete flashing of the backlight and to facilitate a reduction in the number of sources needed to fully flash the backlight. In other applications it would be desirable for the exit output area to remain the same or similar size to the source, but have the beam angle at the output port in the plane of the backlight main element (which in this specification is sometimes called the "horizontal" direction) increased. Further, it would be desirable if these embodiments are highly efficient and are easily moldable as one piece, or at least are designed for easy alignment and assembly for large volume production.

SUMMARY OF THE INVENTION

The present application presents several embodiments that can meet, at least in part, some or all of the aforementioned stated goals. The term "étendue-squeeze optic" or "étendue squeezing optic" is used to describe the optical apparatus of these embodiments. When an étendue-squeeze optic is combined with a light source then it will be called an étendue-squeezing light injector.

One aspect provides an étendue-squeeze optic comprising first and second luminance shifters of transparent material having a refractive index greater than that of air, having inlet ends that are coextensive and each of a first extent in a first direction and are each of a second extent in a second direction, the inlet ends of the luminance shifters forming parts of a common light inlet, and having outlet ends that are coextensive and of the second extent in the second direction and are each longer than the first extent in the first direction; wherein the common light inlet comprises a flat surface at which a critical angle of refraction determines a cone angle for rays propagating into the luminance shifters from the common light inlet; wherein one side of each of the first and second luminance shifters in the first direction comprises a convex surface shaped so that all rays reaching the one side within the cone angle directly from the common light inlet are reflected at the one side by total internal reflection, and wherein a side of each of the first and second luminance shifters opposite the one side comprises a region extruded outside all rays reaching the opposite side within the cone angle directly from the common light inlet; and wherein at the outlet ends the one sides are closer together than the opposite sides.

Another aspect provides an étendue-squeeze optic comprising first and second luminance shifters, each having an inlet of height H and width W, forming part of a rectangular light inlet of height NH and width W, where N is a whole number greater than or equal to 2, and each having an outlet of height H and width greater than W, the outlets abutting and optically coupled to an edge of a backlight element of thickness H and optically coupled to the edge of the backlight element, wherein each of the first and second luminance shifters comprises one side surface facing in the width direction that is convex outwards for at least part of its length and is shaped to reflect by total internal reflection light reaching the side surface directly from the inlet, and comprises an opposite side that is extruded in the width direction outside any ray entering the inlet by refraction; wherein at the outlet ends the one sides are closer together than the opposite sides; and wherein the height is dimension measured in a direction of the thickness of the backlight element and the width is dimension measured in a direction perpendicular to the thickness of the backlight element.

A further aspect provides an étendue-squeeze optic comprising: an entrance surface of width W and height NH, where N is a whole number greater than or equal to two; N luminance guides having respective inlets of width W and height H and extending in a length direction from respective parts of the entrance surface; wherein at least one of the luminance guides comprises a transverse luminance shifter with flat top and bottom boundaries in the height direction, and an outwardly convex side boundary in the width direction, starting at one side of the entrance surface perpendicular to the entrance surface and curving in the width direction across behind the entrance surface towards an opposite side, such that at an outlet end of the transverse luminance shifter remote from the inlets the N luminance guides do not overlap in the width direction; wherein at least one of the luminance guides comprises a luminance height shifter with a flat boundary on the one side, and outwardly convex top and bottom boundaries in the height direction, one of the outwardly convex top and bottom boundaries starting aligned with one of the flat top and bottom boundaries of the transverse luminance shifter and the other of the outwardly convex top and bottom boundaries ending at an outlet end parallel to the flat top and bottom boundaries of the transverse luminance shifter, such that at the outlet ends of the luminance height shifters the luminance guides are of height H and aligned in the height direction, and of width at least W and not overlapping in the width direction; and wherein two of the luminance guides that at the outlet ends are outermost in the width direction have side surfaces on the side of each that faces away from the other outermost luminance guide that are swept outwards in the width direction to form swept regions such that the two outermost luminance guides have a width at the outlet end greater than W, and light rays reaching the swept regions are permitted to diverge in the width direction.

Any of the above étendue-squeeze optics may further comprise at least one third element (N then being at least 3) having an inlet end that is coextensive with the inlet ends of the first and second luminance shifters in the first direction and is of the second extent in the second direction, the inlet end of the third element forming part of the common light inlet, and has an outlet end that is coextensive with the outlet ends of the first and second luminance shifters in the second direction and is between the outlet ends of the first and second luminance shifters in the first direction.

Any of the mentioned étendue-squeeze optics may further comprise at least a third luminance shifter and a fourth luminance shifter, the inlets of which form part of a second rectangular light inlet (also having N at least 2), wherein the extruded side of one of the first and second luminance shifters is unitary with the extruded side of one of the third and fourth luminance shifters, and wherein the outlets of the third and fourth luminance shifters are also coupled to the edge of the backlight element.

The first and second luminance shifters or luminance guides may comprise first parts that diverge in the first direction and second parts that converge in the second direction.

The extruded or swept regions may extend at least from an interface between the first luminance shifter parts and the second luminance shifter parts to the outlet ends. In the length direction the swept regions may extend substantially the length of the luminance height shifters or substantially the whole length of the luminance guides.

Each of the extruded regions may be bounded by a face parallel to the common light inlet and a face perpendicular to the common light inlet. The faces parallel to the common light inlet may then be flush with the common light inlet.

The extruded regions of the first and second luminance shifters, and parts of the first and second luminance shifters from which those regions are extruded, may be not aligned in the second direction.

At least one convex surface of one of the luminance shifters may comprise a surface that is an ellipse or parabola with a focus at the opposite side of the inlet.

At the extruded side of each of the luminance shifters the rays entering the inlet by refraction may pass outside an imaginary side wall that would redirect the rays by total internal reflection to a part of the outlet end of width W starting from the one side of the respective luminance shifter.

At least one of the luminance guides may be substantially straight and parallel sided.

Where two luminance shifters, luminance guides, or other optical elements are adjacent, side by side or one on top of another, the boundary between them may be purely imaginary, allowing light rays to cross freely from one optical element to the other, or may be formed by a narrow air gap or other tangible divider, confining the light rays from each element to its own element. The choice may be a matter of manufacturing convenience or, especially if the two elements are not symmetrical, a separating air gap confining the light rays by total internal reflection may improve the optical performance.

Any of the present étendue-squeeze optics may be combined with a flat light guide having a thickness equal to the second extent or height H, wherein the outlet ends of the luminance shifters or luminance guides abut an edge of the flat light guide and are in optical communication with that edge of the flat light guide, and the faces of the extruded or swept regions that are perpendicular to the common light inlet may then be flush with side edges of the flat light guide.

Any of the mentioned étendue-squeeze optics may further comprise a light source optically coupled to the light inlet through an air-gap, so that light entering the optic through the air-gap is confined to a cone of directions determined by a critical angle of refraction into the optic from air at the air-gap.

Any of the mentioned étendue-squeeze optics may further comprise a light source optically coupled to the light inlet through a collimator or concentrator, so that light entering the optic through the air-gap is confined to a cone of directions determined by the geometry of the collimator or concentrator.

Another aspect provides an étendue-squeeze optic comprising a flat light guide having a thickness in a first direction; a light inlet at an edge of the light guide having a width in the first direction greater than the thickness of the light guide; and a light guiding wedge extending over a face of the light guide, the wedge tapering from the light inlet into the face of the light guide and having two exposed facets forming a V in cross-section transverse to the direction away from the light inlet.

The wedge may extend obliquely to the edge of the light guide with the light inlet, and the optic may then further comprise a second light guiding wedge extending obliquely on the opposite side of a line through the light inlet perpendicular to the edge of the light guide with the light inlet. The light inlet may then have prismatic surfaces angled to direct incoming light along the two light guiding wedges.

The angle of taper of the wedge may increase away from the light inlet. The increase may be in a curve, or may be at one or more breaks of slope.

A further aspect provides an étendue-squeeze optic comprising a flat light guide having a thickness in a first direction; a light inlet at an edge of the light guide having a width in the first direction greater than the thickness of the light guide; and a light guide extending over a face of the light guide from the light inlet, the light guide bounded by curved surfaces upstanding from the face of the light guide and forming a one-dimensional collimator, and comprising at an end of the collimator remote from the light inlet an array of V-grooves sloping into the face of the light guide.

Throughout this specification, the embodiments are illustrated with the backlight element flat and horizontal. For ease of reading, the term "height" and related terms are used to refer to the direction perpendicular to the general plane of the backlight element (which in that orientation is vertical), and "width" and related terms are used to refer to the direction parallel to the general plane of the backlight element and transverse to the direction of light flow along the étendue-squeeze optic (which in that orientation is horizontal). However, the optics may be used in any orientation, and terms such as "width," "height," "up," "down," "vertical," and "horizontal" do not imply any absolute orientation. If the backlight element is not flat, then references to the orientation of the backlight element should in general be taken at the entrance from the étendue-squeeze optic.

BRIEF DESCRIPTION OF THE DRAWINGS

The above and other aspects, features and advantages of the present invention will be apparent from the following more particular description thereof, presented in conjunction with the following drawings wherein:

FIG. 13A shows an alternative 2 to 1 étendue-squeeze optic to that of FIG. 12.

DETAILED DESCRIPTION OF THE PREFERRED EMBODIMENTS

A better understanding of features and advantages of the present invention will be obtained by reference to the following detailed description and accompanying drawings, which set forth illustrative embodiments in which certain of the principles of the invention are utilized.

Figure 1:
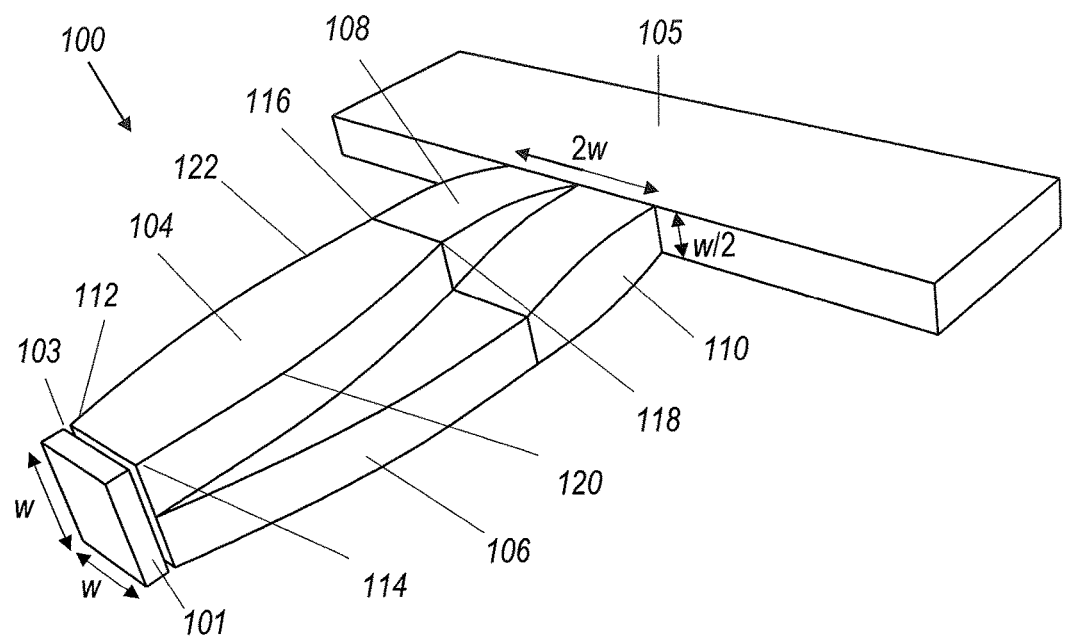
FIG. 1 shows a 2 to 1 étendue squeezing optic in combination with a backlight.

FIG. 1 shows an étendue squeezing light injector of the prior art of U.S. Pat. No. 7,286,296 B2 and U.S. Pat. No. 7,755,838 B2 arranged to inject light into a light guide 105. The light of an LED source 101 refracts into an étendue-squeezer optic 100 through an air gap 103. Étendue-squeeze optic 100 is composed of four luminance shifters 104, 106, 108, 110 which inject the light from the LED 101 into a light guide 105. In this embodiment the étendue squeezer has a square entrance aperture from air gap 103 of side w and an exit aperture of width 2w and height w/2. This optic 100 is therefore able to squeeze the étendue of the source 101 with height w into a light guide 105 with height w/2.

Luminance shifter 104 which shifts the top half of the entrance aperture to the left, and luminance shifter 108, which shifts the top half of the entrance aperture down, are one single part, as are luminance shifters 106 and 110, which shift the bottom half of the entrance aperture respectively to the right and up. Alternatively, all the luminance shifters 104, 106, 108, and 110 and the light guide 105 are all one single part (manufactured in a single operation).

In an embodiment of the optic of FIG. 1, each of the horizontal luminance shifters 104, 106 has an entrance port that spans corners 112 and 114 and an exit port that is shifted a half width from the entrance port, as can be seen by exemplary corners 116 and 118 spanned by luminance shifter 104. Referring to luminance shifter 104, the side towards the center of the optic comprises a straight-line (flat) segment perpendicular to the entrance port from corner 114 to a point 120, and the outer side comprises a straight-line segment perpendicular to the exit port from corner 116 to a point 122. The points 120 and 122 are chosen so that a ray can travel from corner 112 to corner 118 by reflecting at points 120 and 122. The section from 120 to 118 is a parabola with its focus at corner 112, and the section from 112 to 122 is a parabola with its focus at corner 118. The two parabolas have their axes parallel. The design of luminance shifter 106 follows the same approach but is a mirror image of luminance shifter 104 and vertically displaced. The calculation is described in more detail in the previously mentioned Chaves et al. 2006 paper.

If it is desired to offset the luminance shifters 108 and 110 by a greater distance, for example, a distance w relative to the entrance port 112, 114, instead of w/2 as shown in FIG. 1, then the luminance shifters 104 and 106 are extended by extending the lateral parabolas.

In an alternative embodiment, described in more detail in U.S. Pat. No. 7,755,838, if it is desired to offset the luminance shifter 108 by a distance w relative to the entrance port 112, 114, instead of w/2 as shown in FIG. 1, then the luminance shifter 104 is extended by moving edge 118 along parabola 120 to 118 while maintaining the geometry of aperture 116 to 118 and flat segment 116 to 122, and simultaneously moving edge 112 along the parabola 122 to 112 while maintaining the geometry of aperture 112 to 114 and flat segment 114 to 120.

A continuum of possible values of lateral shift of luminance are obtainable by choosing a longer shifter than the configuration last mentioned, or a shifter between the two mentioned.

The vertical luminance shifters 108, 110 can be designed on exactly the same principles as the horizontal luminance shifters 104, 106.

Figure 2:
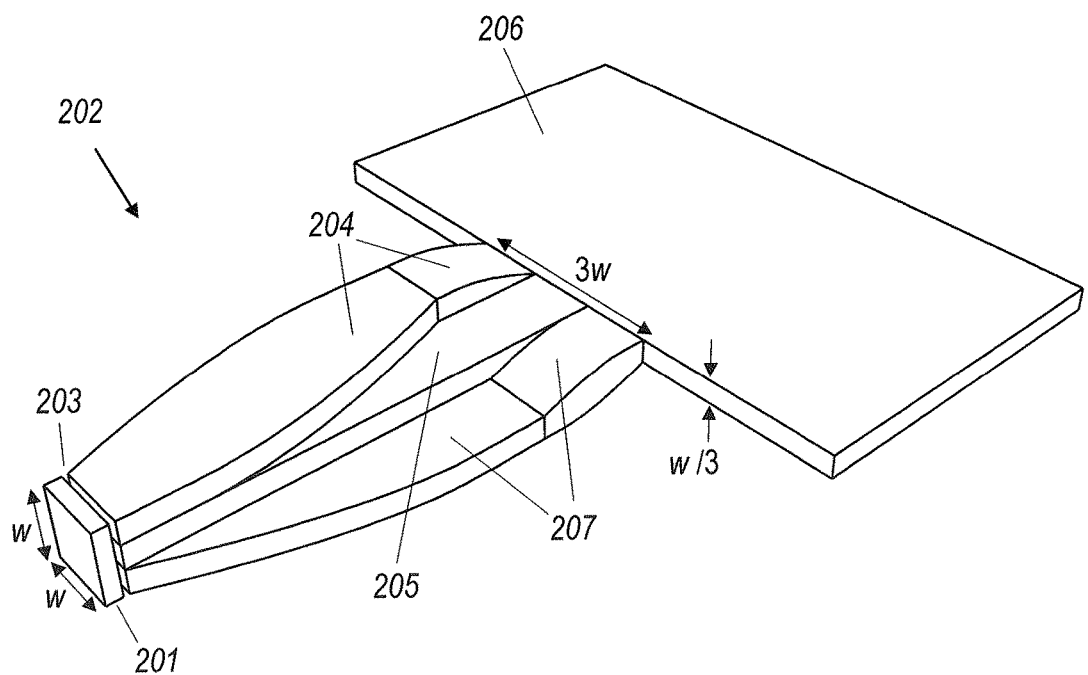
FIG. 2 shows a 3 to 1 étendue squeezing optic in combination with a backlight.

FIG. 2 shows another embodiment using étendue squeezer 202 of U.S. Pat. No. 7,286,296 B2 and U.S. Pat. No. 7,755,838 B2. The light of an LED source 201 refracts into the étendue-squeeze optic 202 through air gap 203. Étendue-squeeze optic 202 is composed of four luminance shifters 204 and 207 and a rectangular light guide 205 which inject the light from the LED 201 into a light guide 206. In this embodiment the étendue squeezer has a square entrance aperture of side w and an exit aperture of width 3w and height w/3. The optic 202 is therefore able to squeeze the étendue of the source 201 with height w into a light guide with height w/3. Luminance shifters 204 are one single part, as are luminance shifters 207.

As shown in FIG. 2, all luminance shifters 204 and 207, light guide 205 and backlight element 206 are all one single part (manufactured in a single operation). Alternatively, some or all of the components 204, 205, 207 and 206 may be made as separate parts and then assembled together.

Referring to FIG. 3A to FIG. 3E, collectively FIG. 3, in one embodiment of an étendue-squeezing light injector the approach is to start with the geometry of our previous étendue-squeeze optic shown in FIG. 1. Selected ones of the vertical walls of the device, those that in FIG. 1 are angled outwards, are swept or extruded left and right to the desired width, as shown by arrows 301. The other curved side walls, those that meet in the middle of the device at the exit end, may be the same shape as in FIG. 1. The resulting solid model can be made into one piece by Boolean uniting the left (upper) and right (lower) parts.

Figure 3A:
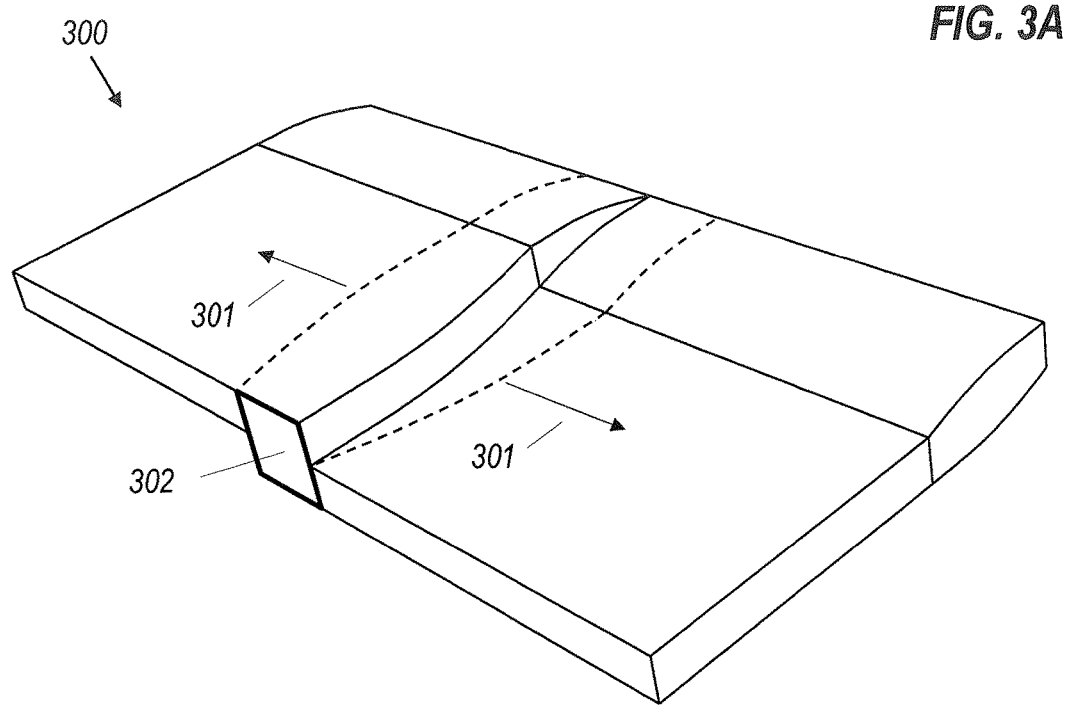
FIG. 3A shows a 2 to 1 étendue-squeeze optic of the present invention.
Figure 3B:
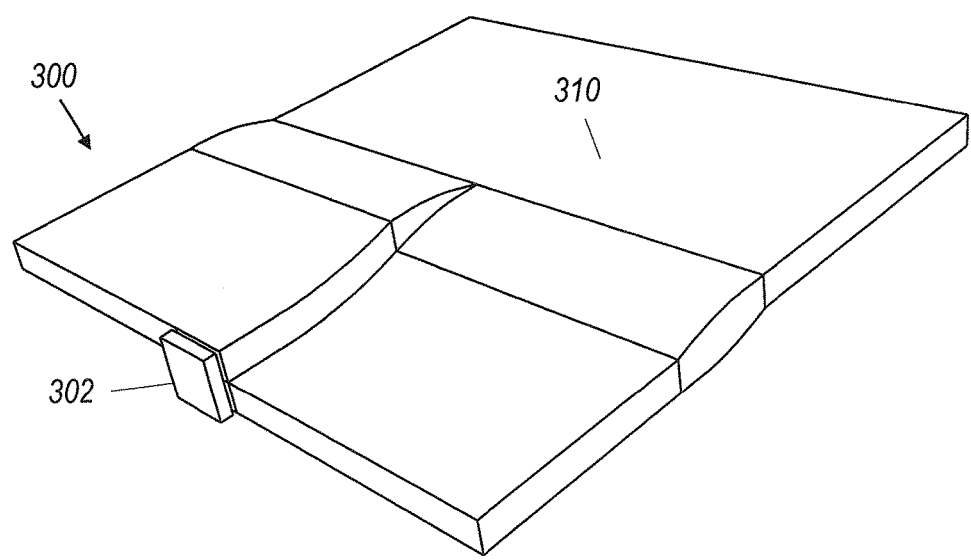
FIG. 3B shows the same optic coupled to a lightguide.

That results in an étendue-squeeze optic 300 where the rays behave as follows. As shown in FIG. 3D, rays traveling to the right from the right (lower) component fan out unimpeded in the horizontal direction. Because the light enters the optic from source 302 by refraction at the air gap 320 (see FIG. 3C), the fan angle in the plan view is limited by the critical angle of refraction into the material of the optic from air. In the vertical direction, the angular spread of the rays is also based on the critical angle, but the fan is constrained, as in FIG. 1, by internal reflection at the upper and lower surfaces of the optic. Rays from the right side which travel left towards the center line of the device either reflect by total internal reflection (TIR) off the left-side wall of the right-hand luminance shifter 106 and are redirected to the right (fanning out in the plan view with an angle based again on the critical angle) or pass above the lower wall and travel in the upper left part in a similar fashion as before (fan in the horizontal direction, etc.). As shown in FIG. 3E, the left side rays behave symmetrically to the right side rays, except that they are above, rather than below, the vertical center of the device. Some rays from the source will intercept both the right and left TIR surfaces in the journey through the optic.

Representative ray-tracings that illustrate the above description are shown in FIG. 3E, as ray-set 1700 (for the upper left element), and FIG. 3D, as ray-set 1701 (for the lower right element). This design can achieve an étendue squeeze ratio of 2 to 1. Advantages over the embodiment of FIG. 1 may include that the ensuing part is easily moldable in one piece, optionally including not only the étendue squeeze optic but also the actual backlight element or light guide 310 (see FIG. 3B), and the ray fan in the horizontal direction enters the solid dielectric backlight with a wider beam when viewed in plan, thereby enabling better flashing and mixing in the backlight. An embodiment of this optic has a calculated geometrical efficiency of 96%, defined as the percentage of light emitted by the LED 302 that enters light guide 310, ignoring absorption and scattering.

It will be seen from FIGS. 3D and 3E that the corners of the extrusion areas at the entrance side are optically inactive, because they are outside the fan of possible rays. These corners may be used for mounting the optic, without affecting its optical properties, and it is therefore suggested to leave them square, but if they are not needed, they may be reduced or omitted to save space, weight, and material.

Figure 3C:
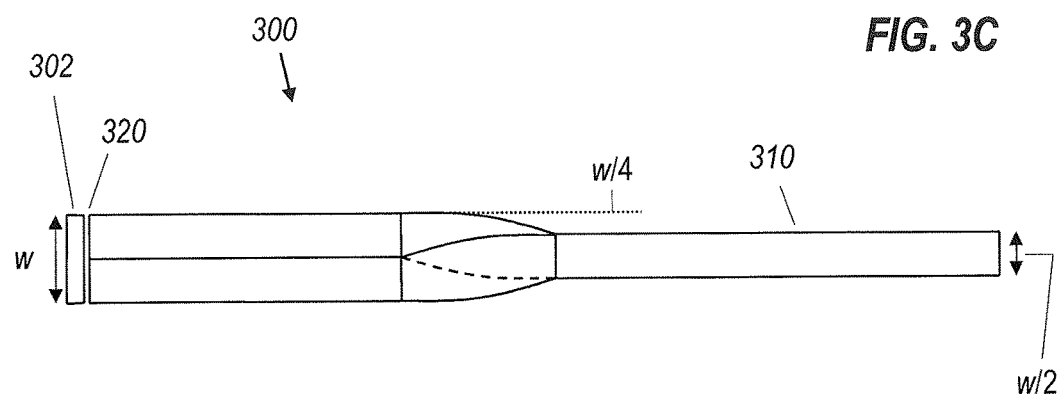
FIG. 3C shows a side view of same.
Figure 3D:
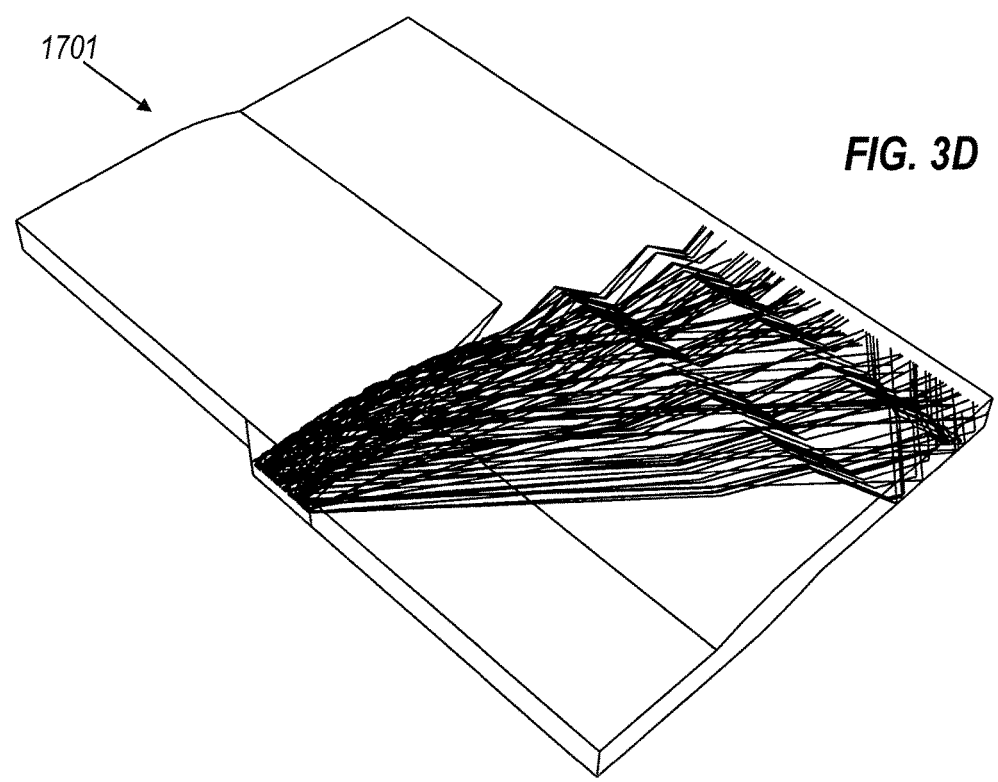
FIG. 3D shows an exemplary ray-set for a lower right element of a 2 to 1 étendue-squeeze optic.
Figure 3E:
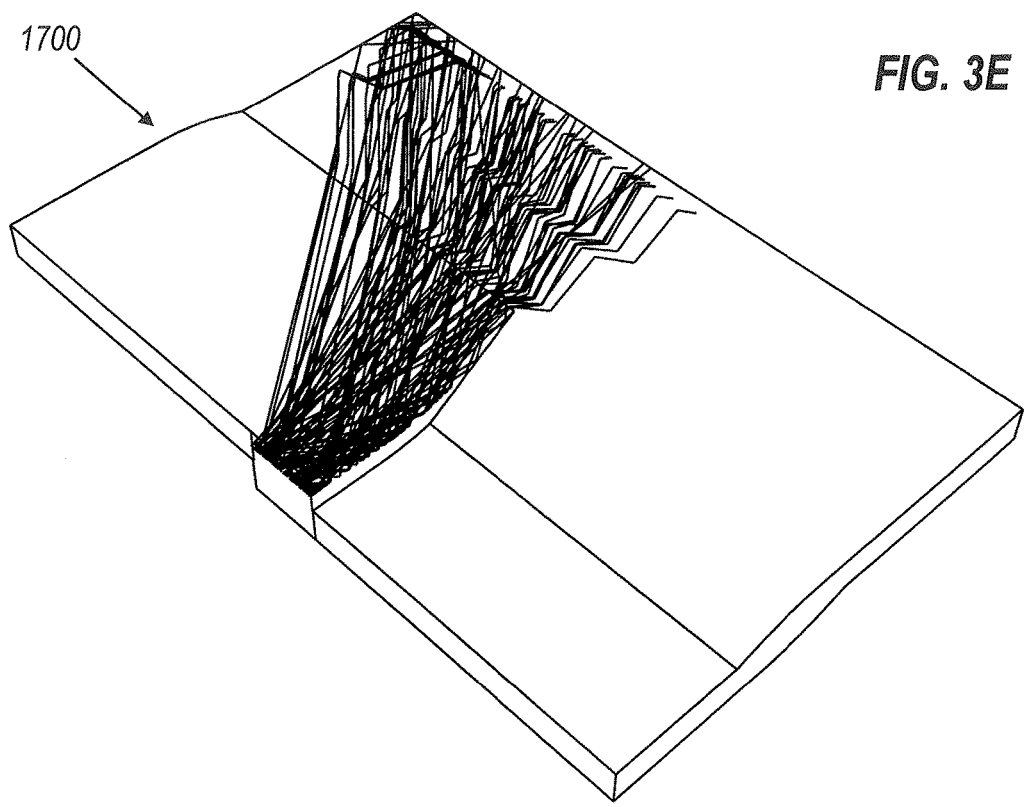
FIG. 3E shows an exemplary ray-set for an upper left element of a 2 to 1 étendue-squeeze optic.

FIG. 3C shows a side view of the optic of FIG. 3B. Étendue-squeeze optic 300 injects light into light guide 310 whose thickness w/2 is half the height w of the LED 302. Étendue-squeeze optic 300 extends up and above the top surface of light guide 310 by a height w/4, and extends an equal distance below the bottom surface of light guide 310.

Figure 4:
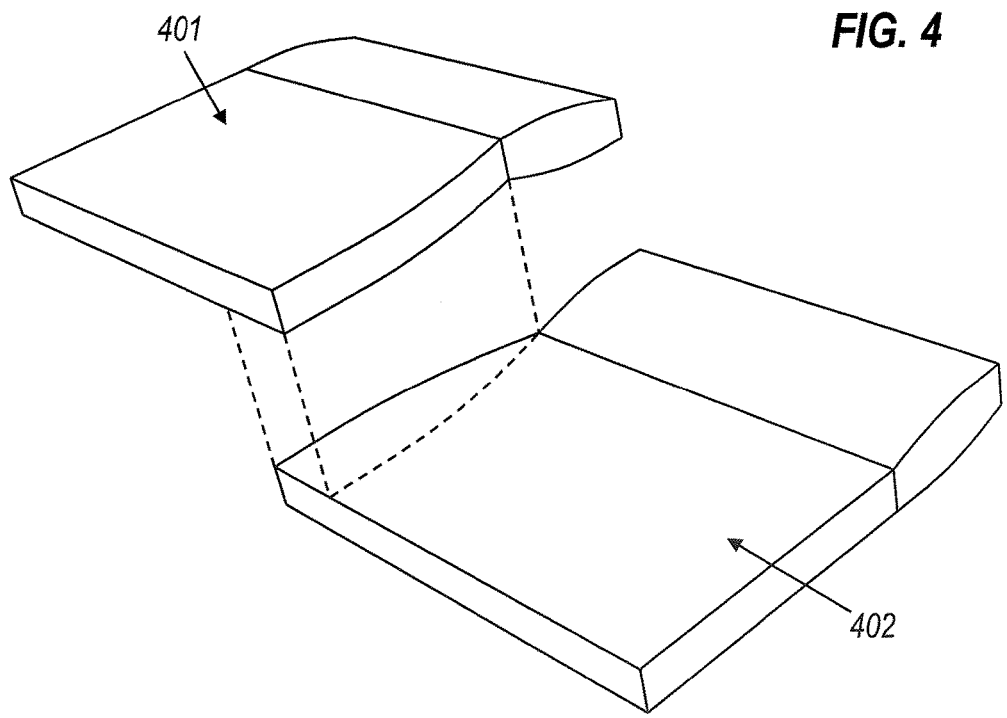
FIG. 4 shows an exploded view of the embodiment of FIG. 3A.

FIG. 4 shows an exploded view of the optic in FIG. 3A, detailing the shape of the top 401 and bottom 402 halves of the optic in FIG. 3A. These are two halves of a single optic, manufactured as a single part, as shown in FIG. 3A. Light may therefore cross freely between the top half 401 and the bottom half 402 where they meet (to the left of the dashed line on bottom half 402 as shown in FIG. 4).

Figure 5:
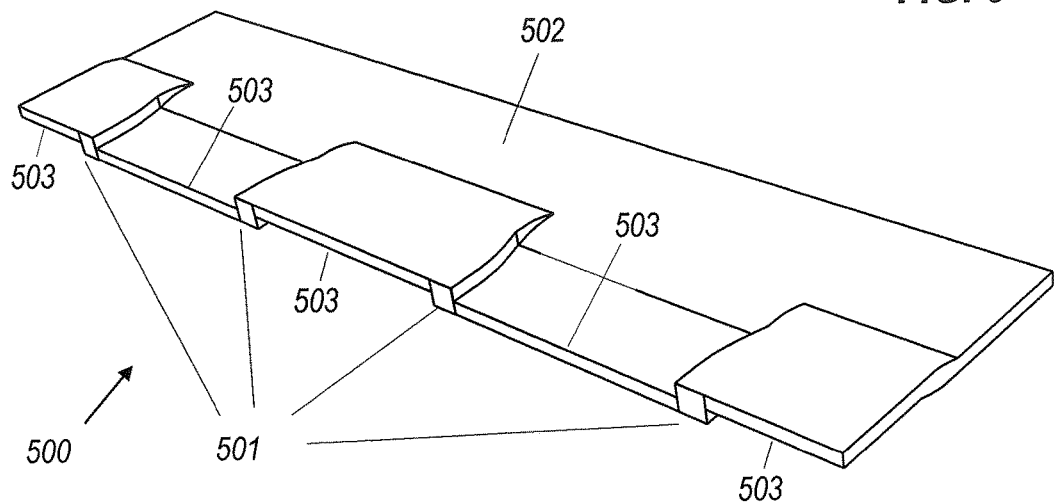
FIG. 5 shows an array of optics of the embodiment of FIG. 3A coupled to a lightguide.

Referring now to FIG. 5, there is shown an étendue squeeze optical assembly 500 comprising an array of the elements based on the embodiment of FIGS. 3 and 4 providing uniform illumination from row of LEDs 501 along an edge of thin light guide or backlight element 502. One set of optical elements in the assembly alternates embodiment 300 of FIG. 3, with a mirror image of itself. One advantage of this approach is that the assembly can be molded as one piece. Thus, the extruded parts of adjacent optics 300 that extend towards each other are either both at the top or both at the bottom, and are joined to form a unitary swept region 503. The width of the unitary swept region 503 may be chosen so that the whole boundary between the étendue squeeze optics and the light guide or backlight element 502 is flashed by rays within the fan from one of the two adjacent LEDs 501.

Figure 6A:
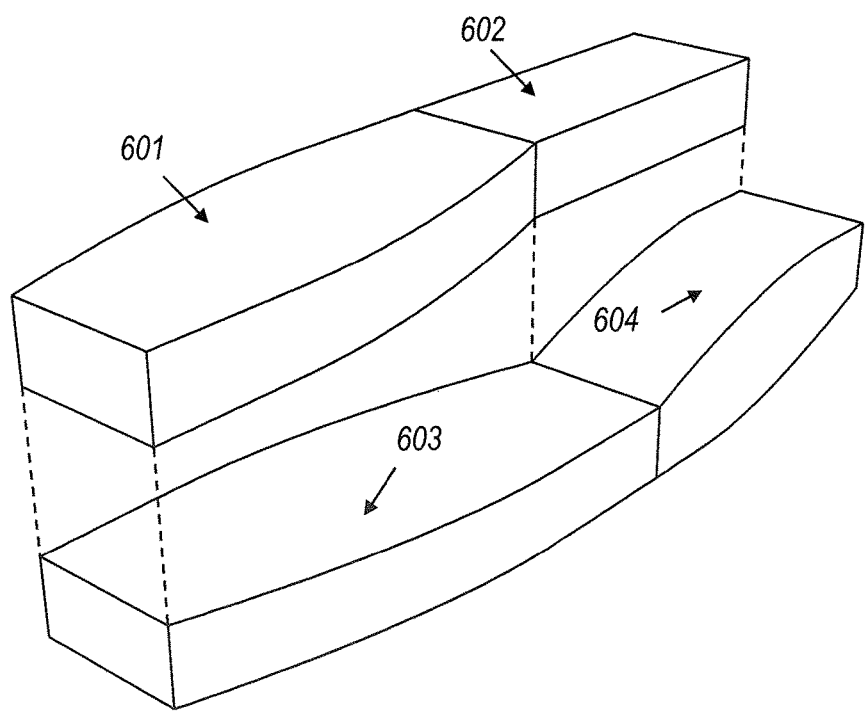
FIG. 6A shows the components of a 2 to 1 étendue-squeeze optic.
Figure 6B:
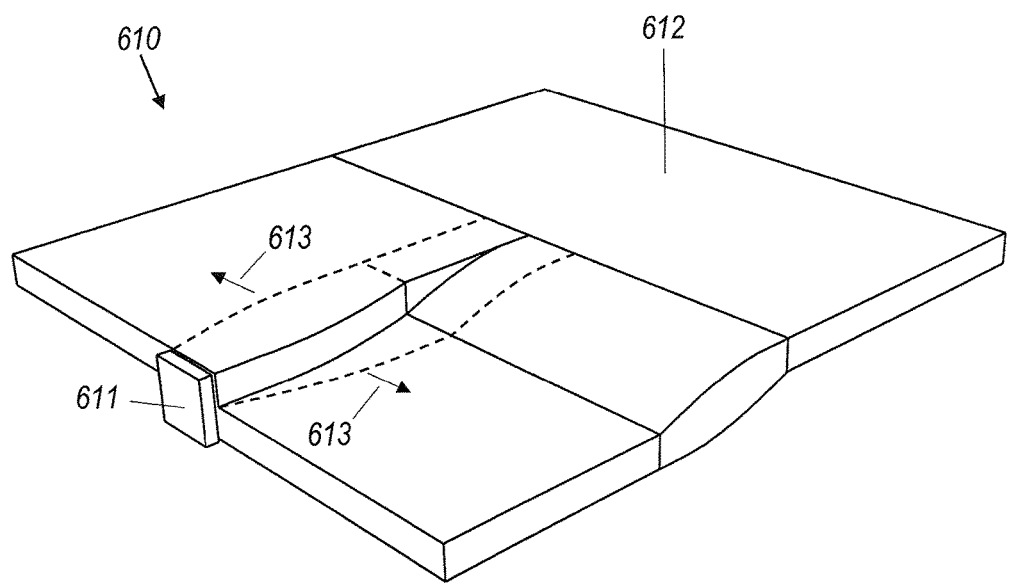
FIG. 6B shows a preferred embodiment 2 to 1 étendue-squeeze optic which does not extend above the plane of the lightguide.
Figure 6C:
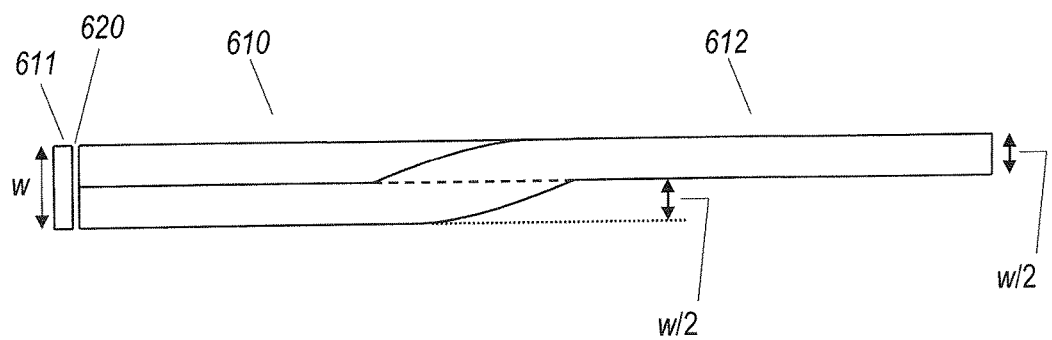
FIG. 6C shows a side view of same.
Figure 7:
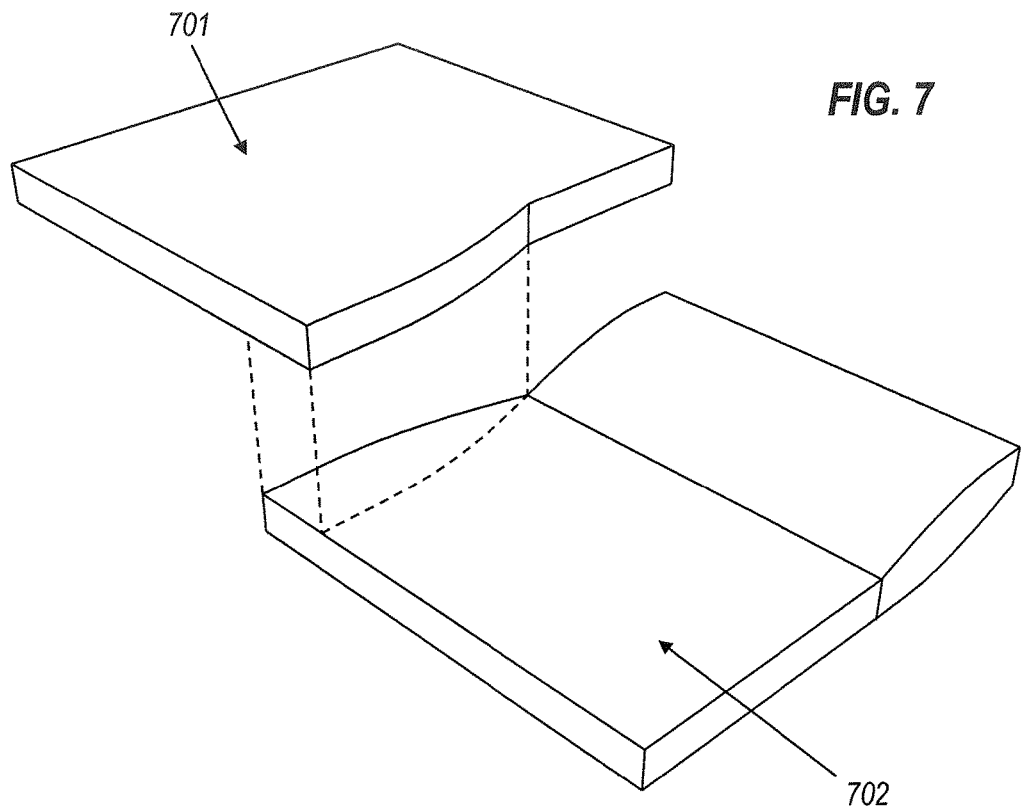
FIG. 7 shows an exploded view of same.

Referring to FIGS. 6A to 6C, collectively FIG. 6, and to FIG. 7, FIG. 6A shows the components of a further embodiment of an étendue-squeeze optic composed of, or exploded into, two separated parts. The top part is composed of luminance shifter 601 and rectangular light guide 602. The bottom part is composed of luminance shifter 603 and luminance shifter 604. This has the feature, which is advantageous in some uses, that one face of the étendue squeezer (the top face as shown in FIG. 6) is flat and flush with the backlight element 612.

FIG. 6B shows an embodiment of an optic based on the component of FIG. 6A, which is similar to the one of FIG. 3, but now with étendue-squeeze optic 610 that does not extend above the top surface of the light guide 612. The light travelling inside the device comes from an LED 611. This embodiment is obtained by stacking on top of each other the components in FIG. 6A and extruding horizontally the outermost vertical walls to the top left and bottom right along directions 613. All components are merged into a single optic and combined with a light guide 612. An embodiment of an optic of this design has been shown to have a geometrical efficiency of 96%.

FIG. 6C shows a side view of the optic 610. The LED 611 injects light into étendue-squeeze optic 610 through thin air gap 620. Étendue-squeeze optic 610 injects light into light guide 612 whose thickness w/2 is half the height of the LED 611. The top surface of optic 610 is at the same height as the top surface of light guide 612. However, the bottom surface of optic 610 extends down, below the bottom surface of light guide 612 by w/2.

FIG. 7 shows an exploded view of the étendue-squeeze optic of FIG. 6B, detailing the shape of the top 701 and bottom 702 halves of the optic in FIG. 6B. These are two halves of a single optic, manufactured as a single part, as show in FIG. 6B.

Figure 8:
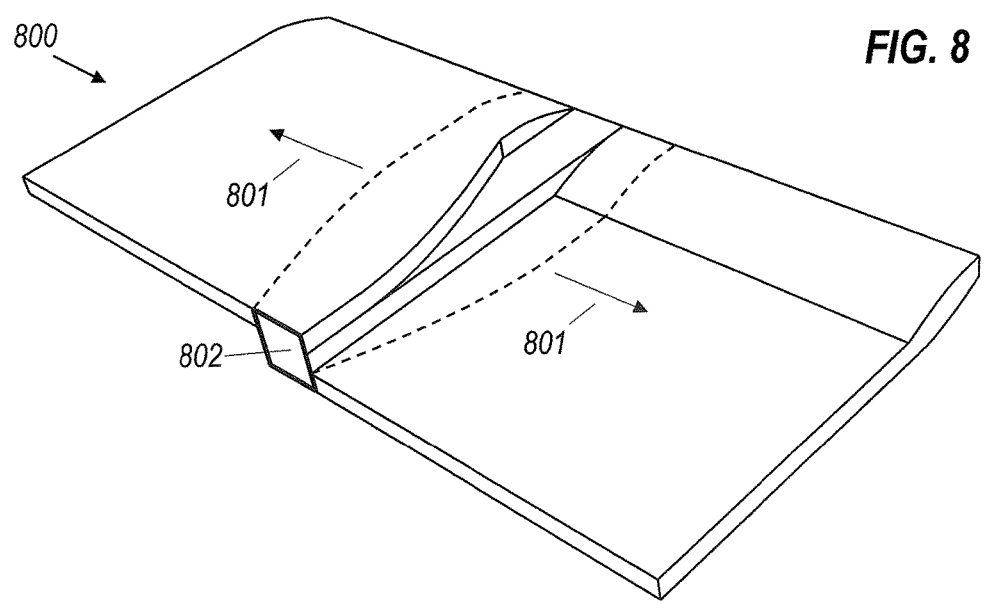
FIG. 8 shows a 3 to 1 étendue-squeeze optic of the present invention.
Figure 9:
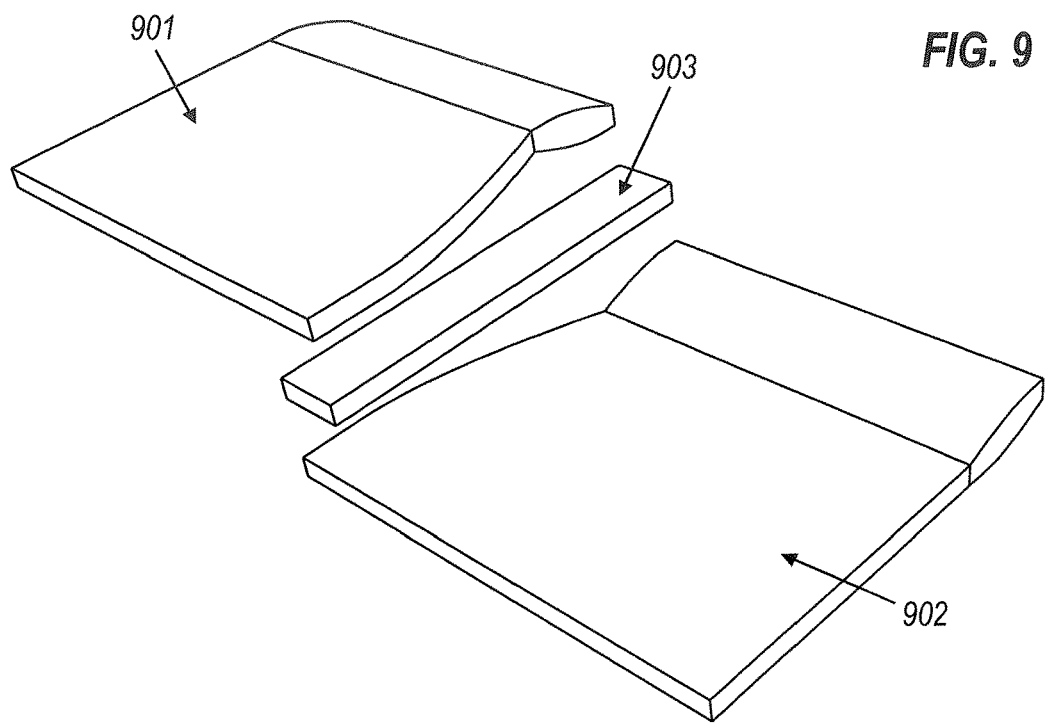
FIG. 9 shows an exploded view of same.

Referring to FIGS. 8 and 9, in another preferred embodiment 800, the embodiment shown in FIG. 2 is the starting point. A similar approach is used as before but only the outer vertical surfaces of luminance shifters 204 and 207 are chosen to be swept or extruded left and right, as shown by arrows 801, to form regions 901, 902. In this embodiment the vertical surfaces relating to the central lightguide 903 are left untouched. The behavior of the rays in the horizontal and vertical operate in a similar fashion as before, but with extra TIR surfaces to be taken into account. This design can achieve an étendue squeeze ratio of 3 to 1.

The LED source is positioned at 802. There is a very narrow air gap between the LED and the entrance of étendue-squeeze optic 800. This optic has a geometrical efficiency of 91%.

FIG. 9 shows an exploded view of the étendue-squeeze optic 800, detailing the shape of the top 901, bottom 902 and middle section 903 of said optic of FIG. 8. These are three parts of a single optic, and may be manufactured as a single part, as shown in FIG. 8.

Figure 10A:
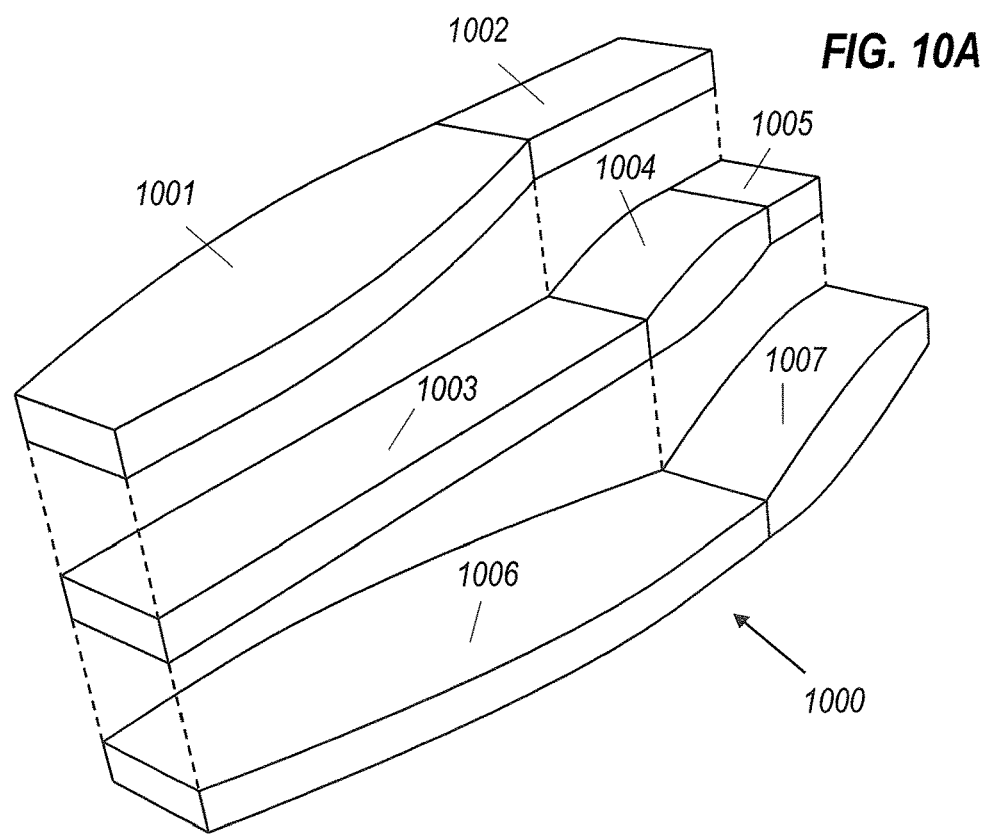
FIG. 10A shows the components of a 3 to 1 étendue-squeeze optic.
Figure 10B:
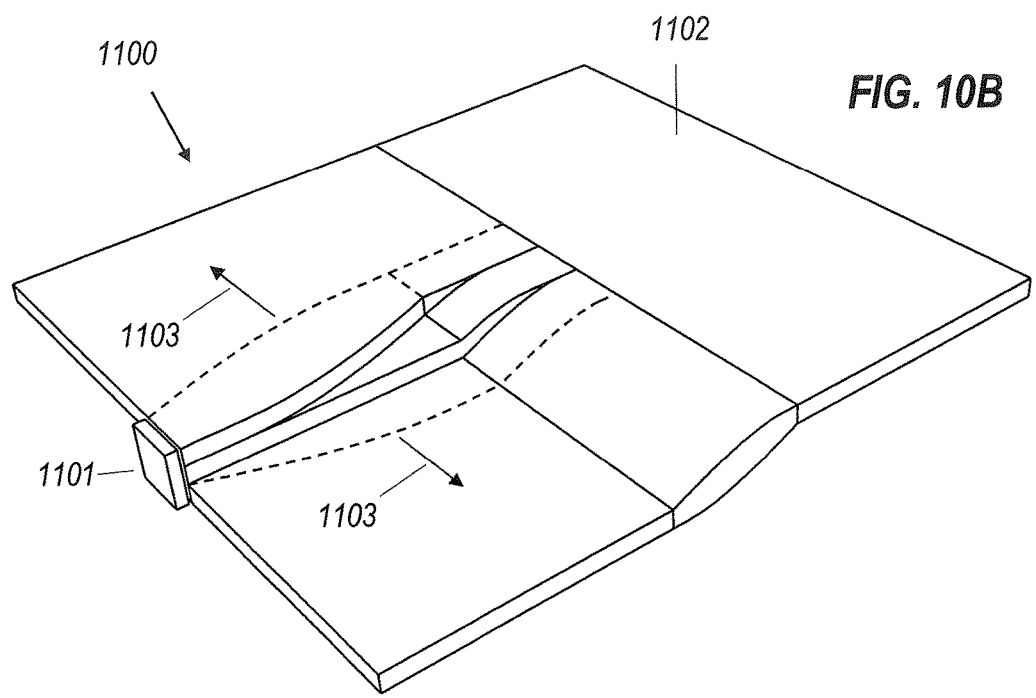
FIG. 10B shows a preferred embodiment 3 to 1 étendue-squeeze optic which does not extend above the plane of the lightguide.
Figure 10C:
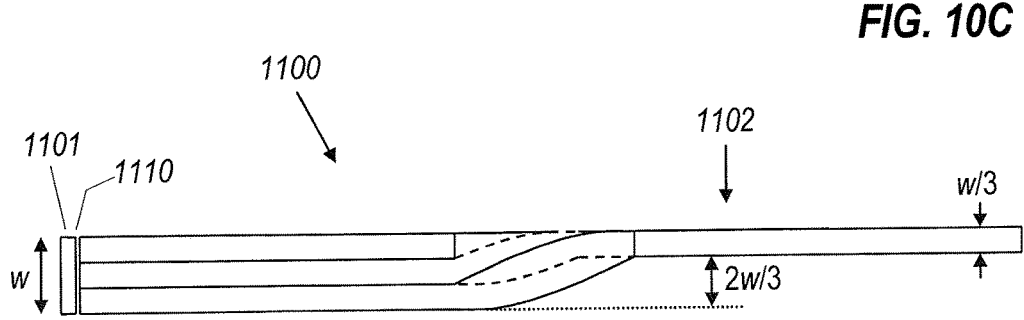
FIG. 10C shows a side view of same.
Figure 11:
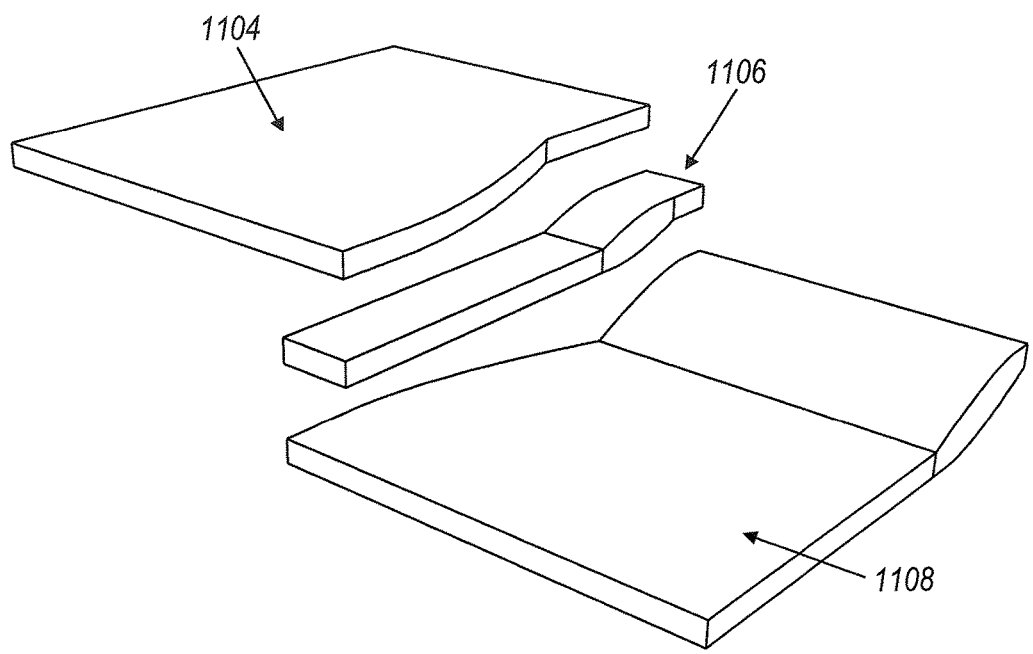
FIG. 11 shows an exploded view of same.

Referring to FIGS. 10A to 10C, collectively FIG. 10, and to FIG. 11, FIG. 10A shows the starting components of an étendue-squeeze optic 1000 composed of three distinct parts. The top part is composed of luminance shifter 1001 and rectangular light guide 1002. The middle part is composed of rectangular light guide 1003, luminance shifter 1004 and rectangular light guide 1005. The bottom part is composed of luminance shifter 1006 and luminance shifter 1007. The rectangular light guide 1005 may not always be necessary, but because the upward luminance shifter 1007 has to shift twice as far as the upward luminance shifter 1004, it was convenient to make the luminance shifter 1007 longer than the luminance shifter 1004.

FIG. 10B shows a preferred embodiment 3 to 1 étendue-squeeze optic 1100 similar to that in FIG. 9, but now with a different étendue-squeezer that does not extend above the top surface of the light guide 1102. Light traveling inside the device comes from an LED 1101. This embodiment is obtained by stacking on top of each other the components in FIG. 10A and extruding horizontally the outermost vertical walls of the top, left component 1001, 1002 to the left and the bottom, right component 1006, 1007 to the right along directions 1103. All components are merged into a single optic and combined with the light guide 1102. An embodiment of this optic has a geometrical efficiency of 92%.

FIG. 10C shows a side view of the optic 1100. The LED 1101 injects light into étendue-squeeze optic 1100 through thin air gap 1110. Étendue-squeeze optic 1100 injects light into light guide 1102 whose thickness w/3 is one third the height of the LED 1101. The top surface of étendue-squeeze optic 1100 is at the same height as the top surface of light guide 1102. However, the bottom surface of étendue-squeeze optic 1100 extends down, below the bottom surface of light guide 1102 by 2w/3.

FIG. 11 shows an exploded view of the optic in FIG. 10B, detailing the shape of the top 1104, bottom 1108 and middle sections 1106 of the optic in FIG. 10B. These are three parts of a single optic, which can be manufactured as a single part, as shown in FIG. 10B.

Figure 12:
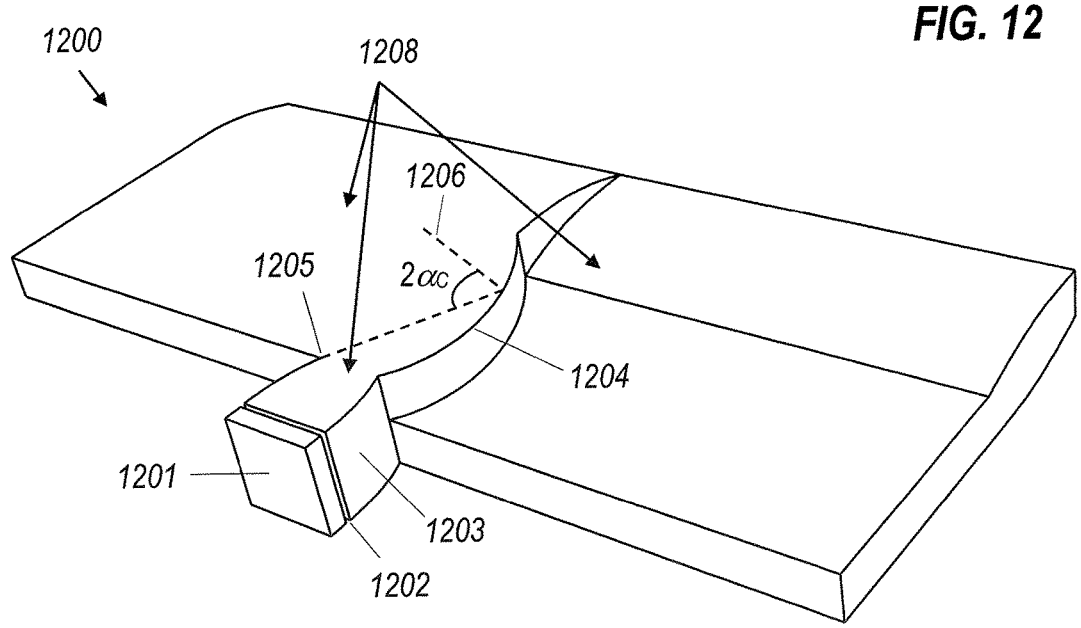
FIG. 12 shows a 2 to 1 étendue-squeeze optic with approximately 180° exit angle.

FIG. 12 shows 2 to 1 étendue-squeezing light injector 1200 comprising an LED 1201, the light from which enters the 2 to 1 étendue-squeeze optic 1208 through an air gap 1202. At the entrance to the optic 1208 is a compound parabolic concentrator (CPC) 1203 that has an acceptance angle $2\alpha_C$ inside the material of étendue-squeeze-optic 1208, where $\alpha_C$ is the critical angle of that material. The exit angle is substantially 180° full angle. Edge 1204 of one of the vertical walls of étendue-squeeze optic 1208 is shaped as a spiral such that the light coming from point 1205, which is the corner at the opposite side of the exit of CPC 1203, always reaches edge 1204 at the critical angle, where it is reflected as indicated by ray (dashed line) 1206. The corresponding wall on the opposite side of the bottom luminance shifter is symmetrically spiral shaped. The remainder of the optic 1208 is essentially similar to that in FIG. 3A. Embodiments of this optic can produce an exit angle with a full angle close to 180° in the horizontal plane (the plane of the light guide).

Figure 13B:
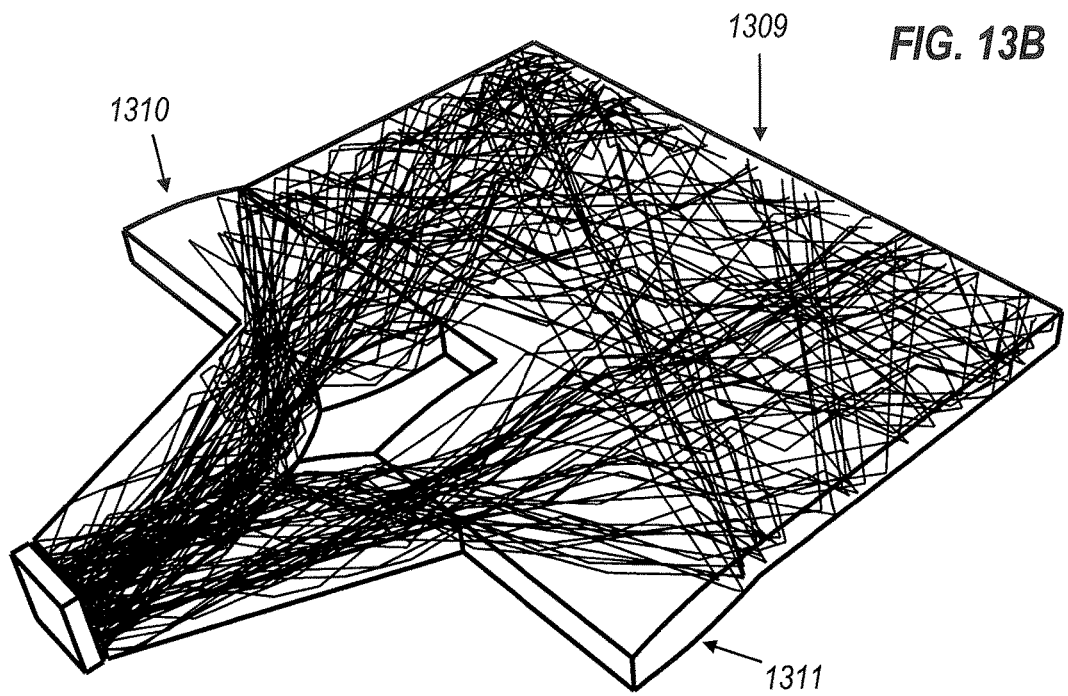
FIG. 13B shows explanatory raytrace for the embodiment of FIG. 13A.

FIGS. 13A and 13B, collectively FIG. 13, shows 2 to 1 étendue-squeezing light injector 1300 comprising an LED 1301, the light from which enters a second component, 2 to 1 étendue-squeeze optic 1312 through air gap 1302, which outputs squeezed light to a third component, light guide 1309. One of the vertical walls of étendue-squeeze optic 1312 is bounded by straight edge 1303 at the entrance end, followed by elliptical edge 1304 with foci at points 1305 and 1306, which are the entrance and exit corners on the opposite side of the respective horizontal luminance shifter. Vertical luminance shifters 1307 and 1308 of the optic 1312 bring the light into light guide 1309.

In contrast to FIG. 3, the horizontal luminance shifters of optic 1312 shift the light sideways by more than w/2, so that there is a space between their exits. In contrast to FIG. 3, only the vertical luminance shifters 1307, 1308, and not also the horizontal luminance shifters, are swept or extruded sideways, so the light fans out from the transition between the horizontal and vertical luminance shifters. Embodiments of this optic can inject light into the vertical luminance shifters 1307, 1308, and thence into the light guide 1309, over a full angle close to 180° in the horizontal plane (the plane of the light guide). The geometry may be similar to that of FIG. 9A, left side, of U.S. Pat. No. 7,755,838. An embodiment of this optic has a geometrical efficiency of 91%.

FIG. 13B shows many light rays traveling through étendue-squeeze optic 1312 and into the light guide 1309. In this raytracing, vertical walls 1310 and 1311 are mirrored. That is equivalent to a simulation of one section of an infinite optic extending to the sides, similarly to FIG. 5, with rays entering and leaving at the walls 1310, 1311.

Figure 14:
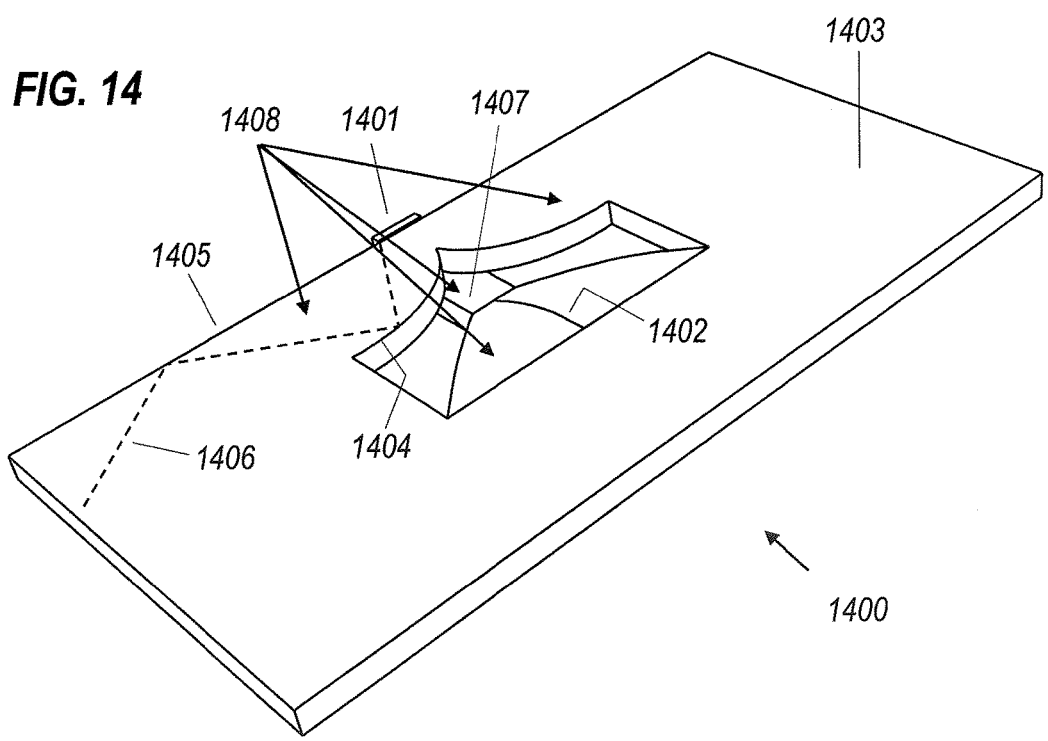
FIG. 14 shows still another 2 to 1 étendue-squeeze optic type.

FIG. 14 shows 2 to 1 étendue-squeezing light injector 1400 comprising a first component, LED 1401, whose light emission enters (through an air gap) a second component, étendue-squeeze optic 1408, comprising subcomponents including rectangular light guide 1407 and luminance shifter 1402, that outputs squeezed light into a third component, light guide 1403. The light from the bottom half of LED 1401 is transported by rectangular light guide 1407 and luminance shifter 1402 and injected into light guide 1403. As may be seen in the drawing, in side elevation the luminance shifter 1402 is a vertical luminance shifter similar to 604, 1007, 1307, 1308, etc., but in plan view it is triangular, to allow the light to fan out sideways. The light from the top half of the LED is collected by a pair of vertical walls with profile 1404, curving outwards from the centerline, that reflect the light (by TIR) towards back surface 1405, which reflects the light forwards (by TIR) into the light guide 1403. Ray 1406 exemplifies the path of light. As shown by ray 1406, at least some rays may also reflect off the side walls of the light guide 1403. Depending on the exact geometry, the reflection at side walls may be by TIR, or the side walls may be silvered. A geometry similar to the 90° angle-turner in FIG. 1 of our earlier U.S. Pat. No. 8,749,898 may be used.

Figure 15:
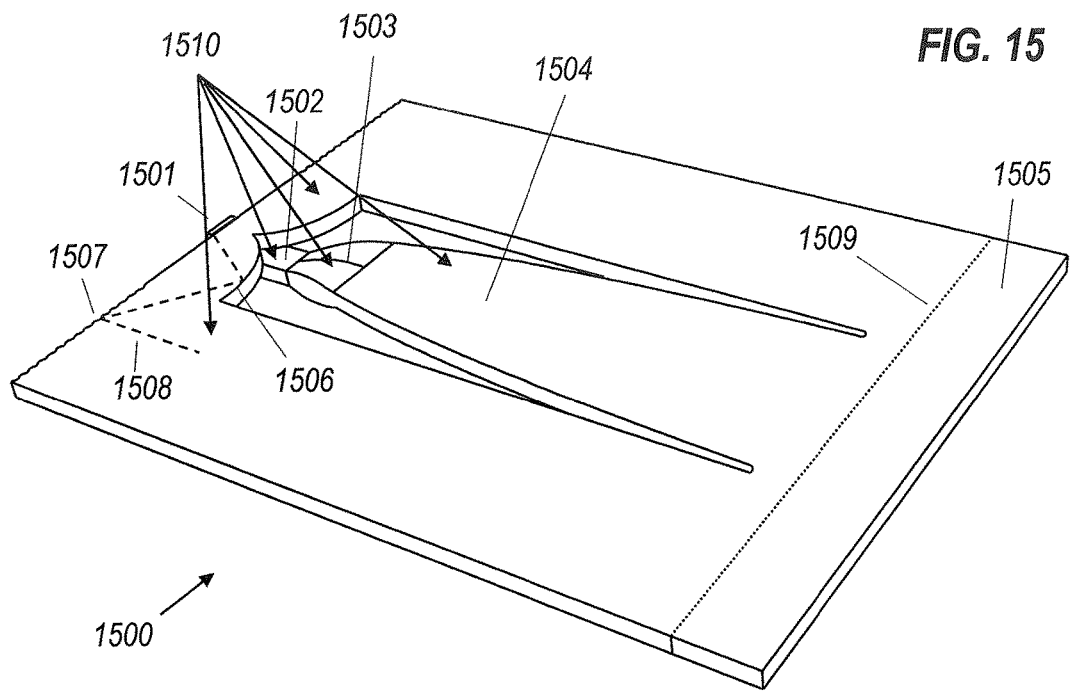
FIG. 15 shows a 2 to 1 étendue-squeeze optic with included collimation apparatus and optional embedded diffuser.

FIG. 15 shows 2 to 1 étendue-squeezing light injector 1500 that includes a collimation feature to the étendue-squeeze optic. Light injector 1500 comprises a first component, LED 1501, whose light emission enters second component, étendue-squeeze optic 1510 with multiple sub-components (including an optional diffuser), through a narrow air gap, and a third component, light guide 1505, which receives light from optic 1510. Étendue-squeeze optic 1510 has additional features to collimate the light. The light from the bottom half of LED 1501 is transported by rectangular light guide 1502 and luminance shifter 1503. It is then collimated by collimator 1504 and injected into light guide 1505. The light from the top half of the LED is collected by a pair of vertical walls with profile 1506 that reflect the light (by TIR) towards the part of back surface 1507 that is laterally outside the collimator 1504. That part of back surface 1507 contains a microstructure that reflects the light back (by TIR) into the light guide 1505 aligned along the longitudinal direction of the optic. Ray 1508 exemplifies the path of light. Suitable microstructures are described in earlier U.S. Pat. No. 8,749,898 that has several inventors in common with the present invention.

This embodiment combines luminance shifting and collimation in one direction only. One advantage of this approach is that the exit aperture of the device is wider than the exit aperture of the devices of FIG. 1 and FIG. 2. Another is that collimated light is needed for certain types of backlight ejectors and diffusers to work. The collimated light travelling inside light guide 1505 can be optionally diffused horizontally by diffuser 1509. Because the diffuser is a separate optical element, the amount of diffusion can be controlled separately from other optical properties of the optic.

As with the previous embodiments, the ray fans in the vertical direction are reduced in height depending on the starting architecture chosen, for example, 2 to 1, 3 to 1, or 4 to 1. The fan angle in the vertical direction will be based on the critical angle for the material. In the horizontal angle the degree of collimation can be varied as required. The tighter the collimation angle the larger the length of the output beam at the exit port of the device. For example, if the beam angle starts out in the device at 45° then a typical collimation angle at the exit port would be half that or 22.5°. In an alternative embodiment the partially collimated light is directed to an embedded holographic diffuser which is located between the collimating étendue squeezer and the solid dielectric backlight. The beam output from the embedded holographic diffuser can have a variety of outputs, including a line output, such as the one made by Luminit of California with 0.2°×40° full width at half maximum intensity (FWHM) or a custom diffuser designed to provide a required intensity profile inside the solid dielectric backlight in the vertical and horizontal directions.

Other embodiments are possible which can combine the functions of luminance shifting with collimation in a more compact optic are possible but not shown. These, and a wide variety of other designs, can be derived from the principles taught herein, as will be understood by persons skilled in the art.

Figure 16:
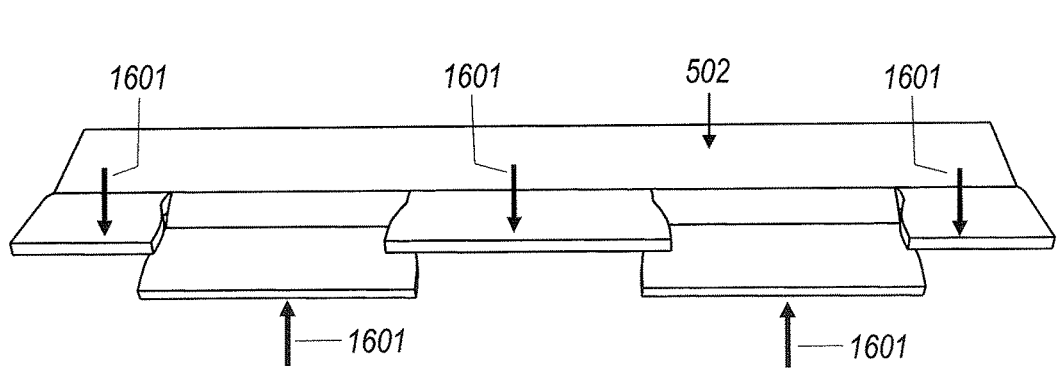
FIG. 16 shows an alternative configuration that has an air gap between the two halves of the étendue-squeeze optic.
Figure 17:
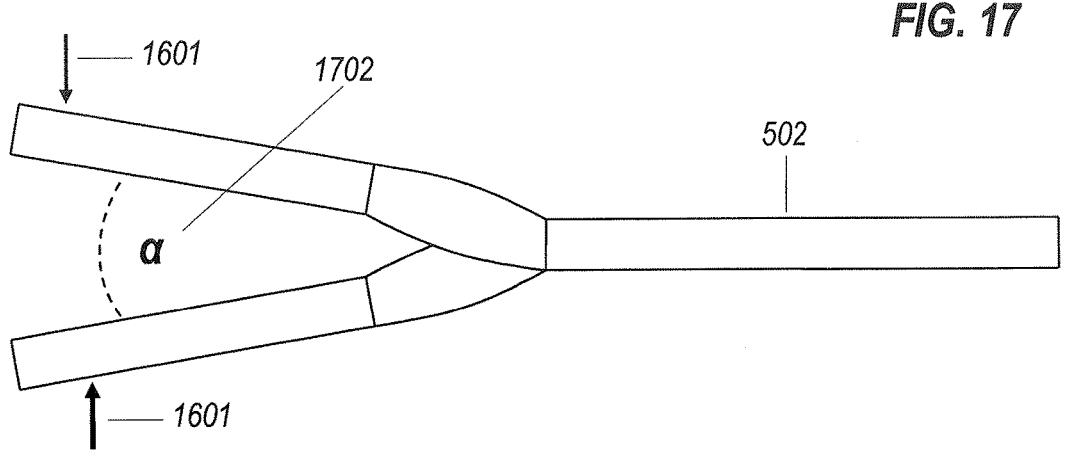
FIG. 17 shows a side view of the embodiment in FIG. 16.

FIGS. 16 and 17 show the same device as FIG. 5, but with the étendue-squeeze optic split along the horizontal line that is the upper edge of the lower extrusions 503 and the lower edge of the upper extrusions 503, and opened in a Y shape. Light guide 502 is kept the same. The optic in FIG. 5 is recovered by pressing the sections of the optic together as indicated by arrows 1601, in FIG. 17, taking advantage of the flexibility of the plastic material used to make the part.

Molding the optic as shown in FIG. 16 and then pressing the sections together, results in an optic similar to FIG. 5, but with an air gap between the top and bottom portions of the étendue-squeeze optic. This reduces the cross talk between top and bottom portions of the optic, enabling in a higher efficiency. The extrusions may then be held in position by mechanical clamps. By comparing FIG. 16 with FIGS. 3D and 3E, regions of the extrusions that are substantially optically inactive can easily be identified. If the clamps contact the extrusions only in those inactive regions, the necessary pressure can be applied as indicated by the arrows 1601 without substantially impairing the optical performance of the device, even if the clamps actually damage the surface of the optic.

FIG. 17 shows the optic of FIG. 16 in an end view. Angle α 1702 should be as small as manufacture allows (typically a few degrees of draft angle). That will reduce the necessary bending of the plastic.

Figure 18A:
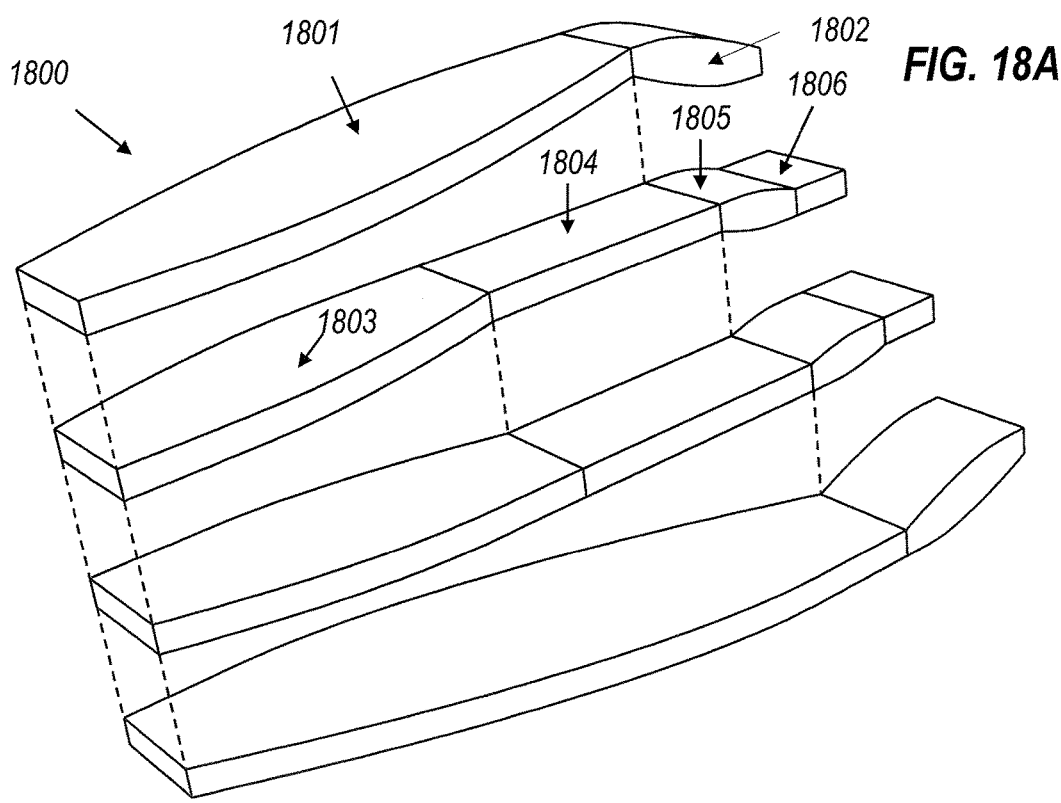
FIG. 18A shows the components of a 4 to 1 étendue squeezing optic.
Figure 18B:
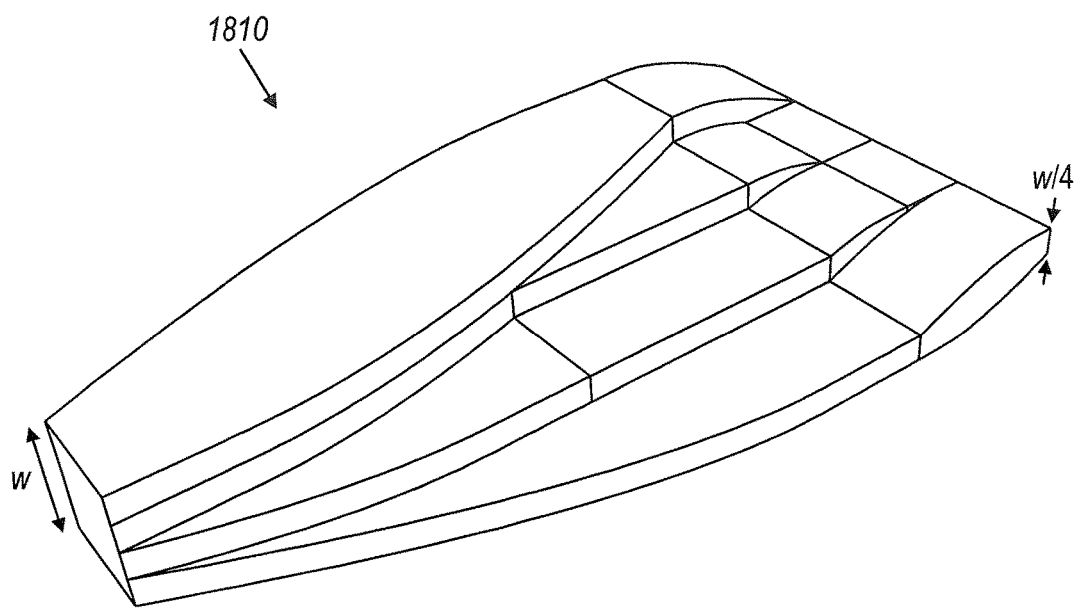
FIG. 18B shows a 4 to 1 étendue squeezing optic.

FIGS. 18A and 18B, collectively FIG. 18, show optical components 1800, comprising four separate parts, which when combined produce a 4 to 1 étendue-squeeze optic. The top part is composed of luminance shifter 1801 and luminance shifter 1802. The second part is composed of luminance shifter 1803, rectangular light guide 1804, luminance shifter 1805, and rectangular light guide 1806. The bottom two parts are symmetrical to the top two parts.

FIG. 18B shows 4 to 1 étendue-squeeze optic 1810 that results from combining optical components 1800 of FIG. 18A. This may be combined with a square LED of side w at the entrance (left in FIG. 18) and a light guide or backlight element of thickness w/4 at the exit end.

Figure 19:
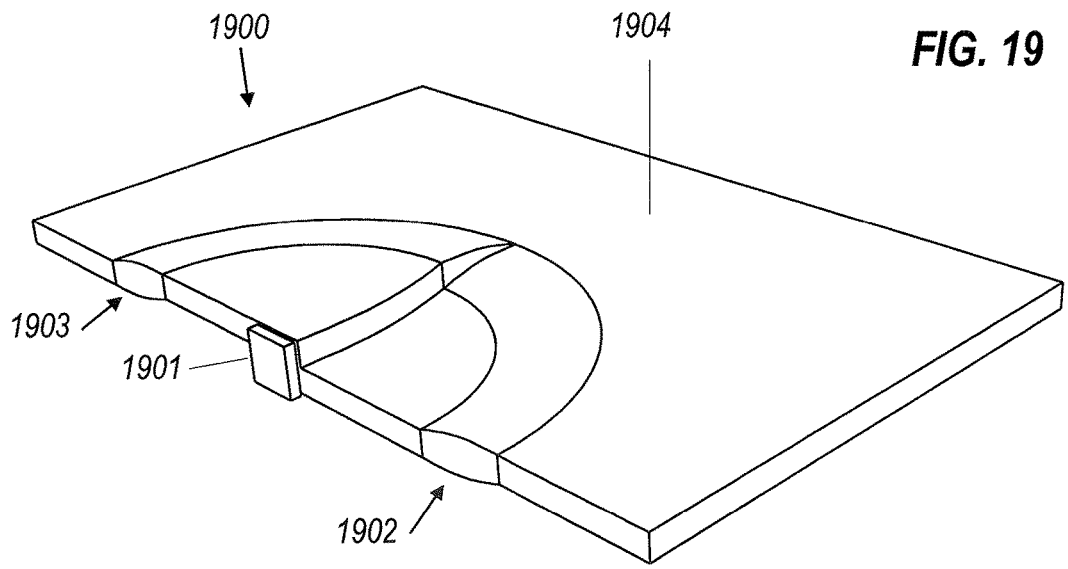
FIG. 19 shows a 2 to 1 étendue squeezing optic with rotational luminance shifters.
Figure 20:
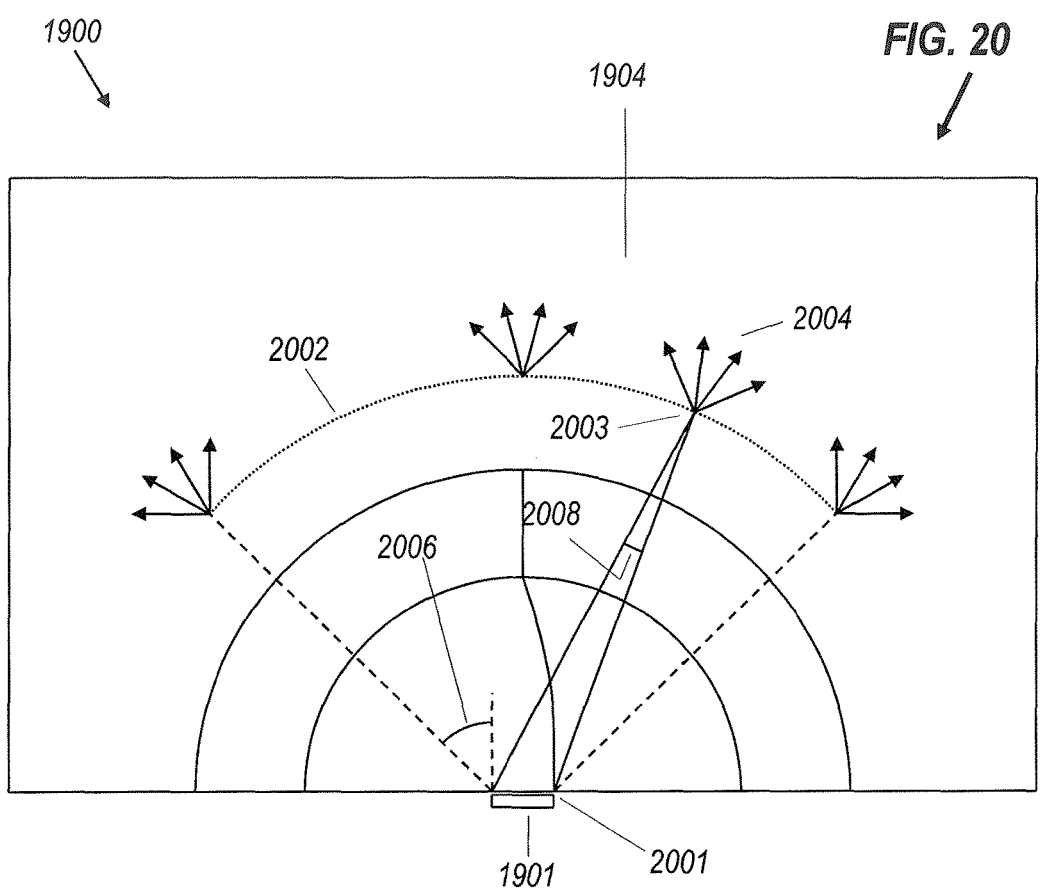
FIG. 20 shows a top view of the embodiment in FIG. 19 with a diffuser added.

FIGS. 19 and 20 show a 2 to 1 étendue-squeeze optic 1900 based on the apparatus of FIG. 3A. Vertical luminance shifters 1902 and 1903 now each have rotational symmetry relative to the center of the entrance aperture in front of the LED 1901, and each extend through 90 degrees. The horizontal luminance shifters, instead of being extruded in a straight line sideways, are extruded in a part circle around the same center. 2 to 1 étendue-squeeze optic 1900 injects light from LED 1901 into light guide 1904. This same principle may be applied to other embodiments disclosed herein.

FIG. 20 shows a top view of the embodiment in FIG. 19. The light of LED 1901 enters the optic through a narrow air gap 2001 and is confined to the critical angle $\alpha_C$ 2006. This light travels down the optic and optionally eventually encounters diffuser 2002 that diffuses this light in the horizontal direction only (in the plane of the figure). Incoming light from the LED reaching point 2003 on the diffuser is confined to narrow angle θ 2008, determined by the angular size of the diffuser, and the outgoing light is diffused to a wider range of directions 2004.

The embodiments in FIGS. 1-20 may be molded, but they need the mold inserts to have features on both sides, since there are structures both on the top and bottom surfaces of the light guides. And the top and bottom mold inserts need to be accurately aligned. It would be preferable to have étendue squeezing optics with structures only on the top (or only on the bottom) surface and having a flat bottom (or top) surface. That would simplify the mold and no special alignment would be needed between the top and bottom halves of the mold cavity.

Figure 21:
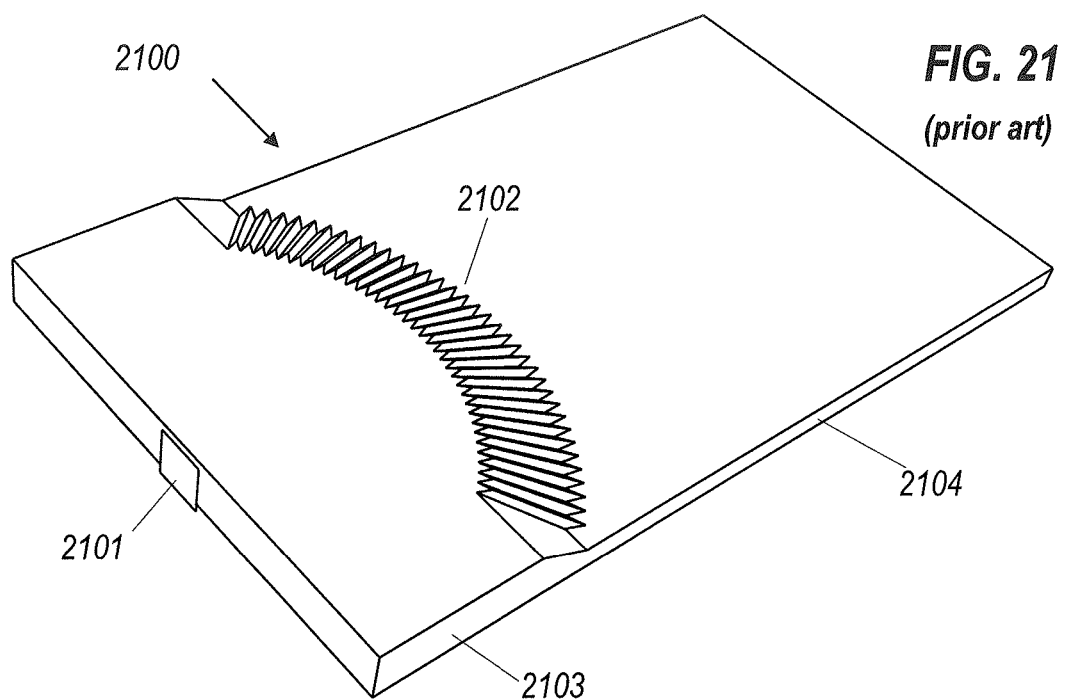
FIG. 21 shows an étendue squeezing optic of the prior art.

FIG. 21 shows a 2 to 1 étendue squeeze light engine 2100 of the prior art of US 2010/0195019 A1 of Shinohara et al., comprising LED 2101 and a solid dielectric light guide comprising entry section 2103, which is substantially the same height as LED 2101, an arc of radial V-groove wedges 2102 and an exit section 2104, which is thinner in height than LED 2101. Light from LED 2101 enters into entry section 2103 through a narrow air gap and travels through entry section 2103 where it fans out in the horizontal direction. When the light reaches radial V-groove wedges 2102 the beam is reduced in vertical height so it can enter exit section 2104.

Figure 22:
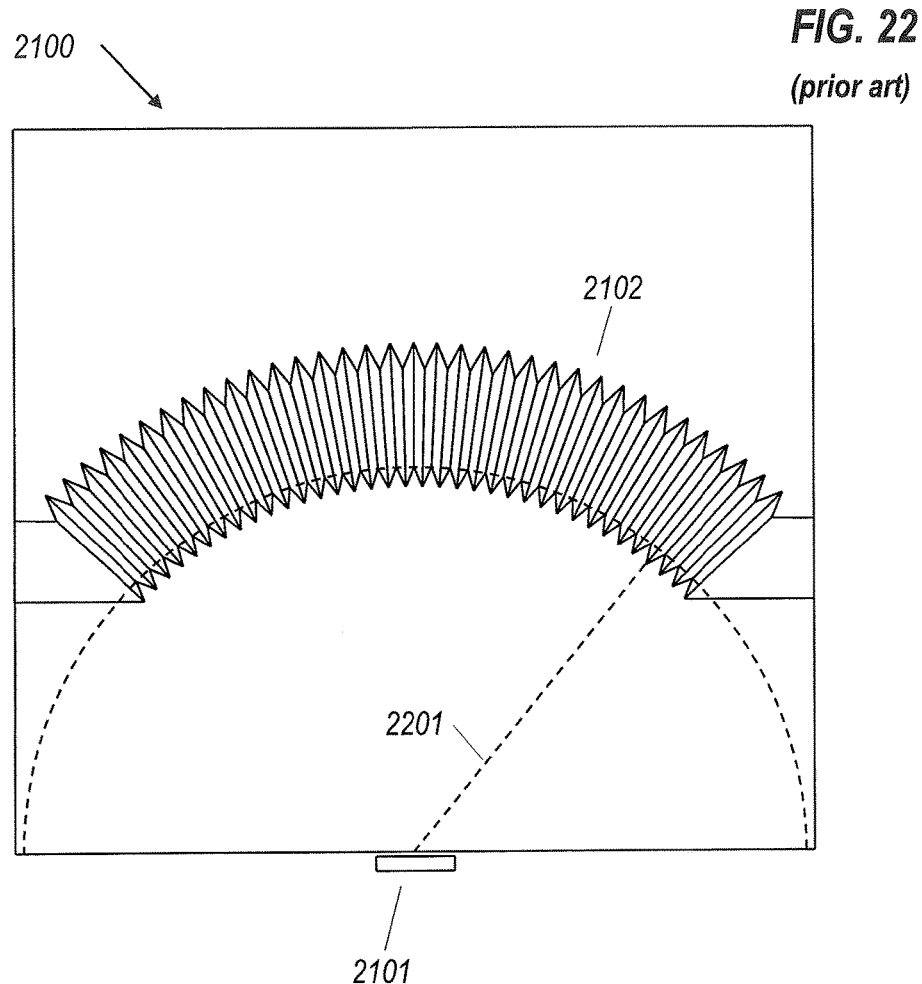
FIG. 22 shows a top view of the optic in FIG. 21.

FIG. 22 shows a plan view 2200 of light engine 2100 of FIG. 21. The axes of radial V-groove wedges 2102 in the plan view are aligned to point to the center of the entrance aperture where the LED light enters the light guide, as exemplified by dashed line 2201, and their starting points are on a circle centered at the center of the entrance aperture.

The embodiment of the prior art of FIG. 21 and FIG. 22 has the advantage that only the top surface of the light guide has structures, and the bottom can be flat. However these structures include many small wedges, which are hard to manufacture and mold. Unless great care is taken in the molding, in practice the edges of these wedges will not be perfectly sharp, leading to losses, which will be greater because of the large number of edges present. That conflicts with one of the other objects of our present designs, which is to be easily and economically manufactured. It would therefore be preferable to have a structure that is only on the top surface, and is as simple as possible, with a minimum number of facets. Also, the many wedges of the device of FIGS. 21 and 22 occupy a large area of the top surface of the light guide. We have also found that the V-grooves work efficiently only if the light entering them is confined to a narrow range of angles, and in particular that it is difficult to obtain both a wide acceptance angle and a high optical squeeze ratio. The range of angles that must be accepted is determined by the angle subtended by the LED 2101 at the inlet end of the V-groove, and can be kept small only by having a large radius to the arc of V-groove wedges. It would be preferable to have simpler structures with a smaller footprint.

Figure 23:
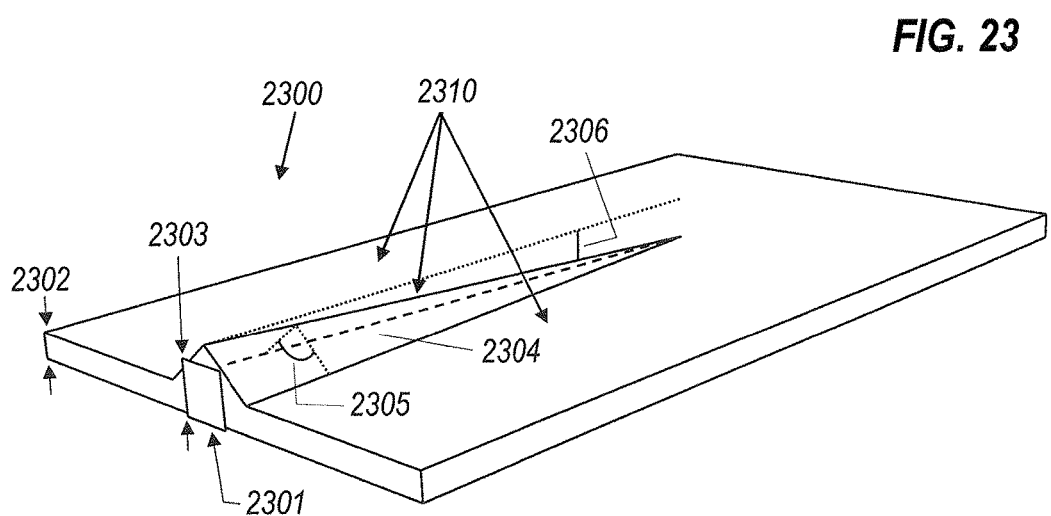
FIG. 23 shows a 2 to 1 étendue squeezing optic whose top surface has one inverted V protuberance.

FIG. 23 shows 2 to 1 étendue-squeezing light injector 2300 comprising an étendue-squeezing optic 2310 (with a main body and wedge protuberance) and an LED 2301, which is separated from the optic by a narrow air gap. The main body of optic 2310 has a constant thickness 2302, which in this embodiment is half of the height 2303 of LED 2301. Part of the LED emitted light is injected directly into the main body of the optic 2310 while another part is injected into wedge 2304 (an inverted V protuberance) that forms part of the top surface of light guide 2310. This wedge is characterized by an aperture angle 2305 (the angle between the two sides of the V, measured in a vertical plane perpendicular to the top edge of the wedge), and by the angle to the horizontal 2306 of the top edge of the wedge. In one embodiment for a 2:1 compression ratio using PMMA plastic, in which the aperture angle 2305 is approximately 102° and the angle to the horizontal 2306 is approximately 4°, the geometrical transmission efficiency of the optic is above 90%. For the optimum efficiency embodiments, the efficiency losses come from the entry surface of wedge 2304, which does not collect all the light from LED 2301. In particular, to reduce the overall height of optic 2310, the sloped surfaces of wedge 2304 are brought very close to the top corners of LED 2301, and some light can be lost at those top corners. Some light is also lost by failing TIR inside the light guide. To reduce the overall height of the optic 2310, the top vertex of the wedge 2304, above the LED 2301, may be chamfered. Provided that only material outside the critical angle of the entrance surface is removed, that should have no appreciable effect on the optical behavior of the optic. If a flatter angle of chamfer is used, then the changed distribution of the rays that reach the chamfer surface may need to be considered, but the effect is not likely to be large.

In general other embodiments can be designed using what is taught in FIG. 23 by adjusting the ratio between heights 2303 and 2302, providing varying étendue squeezing ratios. The same holds true for the embodiments discussed below and shown in FIG. 24 through FIG. 30 which are illustrated with a 2 to 1 étendue squeeze, but whose geometries could be adjusted to other étendue squeeze ratios using what is taught herein as it will be understood by persons skilled in the art.

Figure 24:
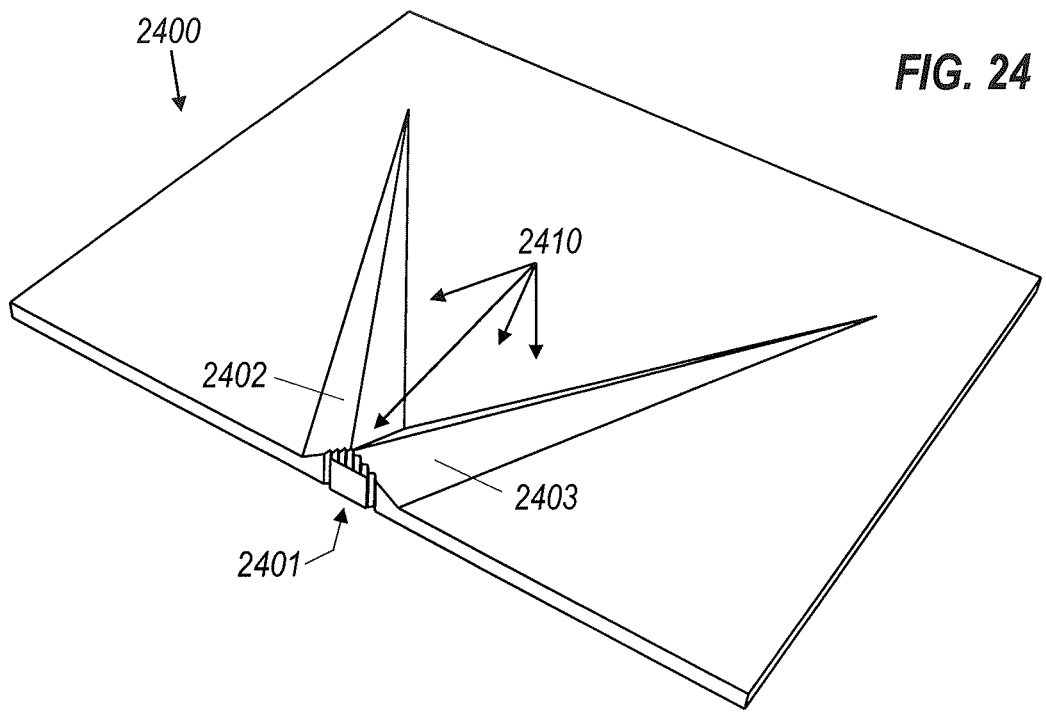
FIG. 24 shows a 2 to 1 étendue squeezing optic whose top surface has two inverted V protuberances and a beam splitter for the incoming LED light.
Figure 25:
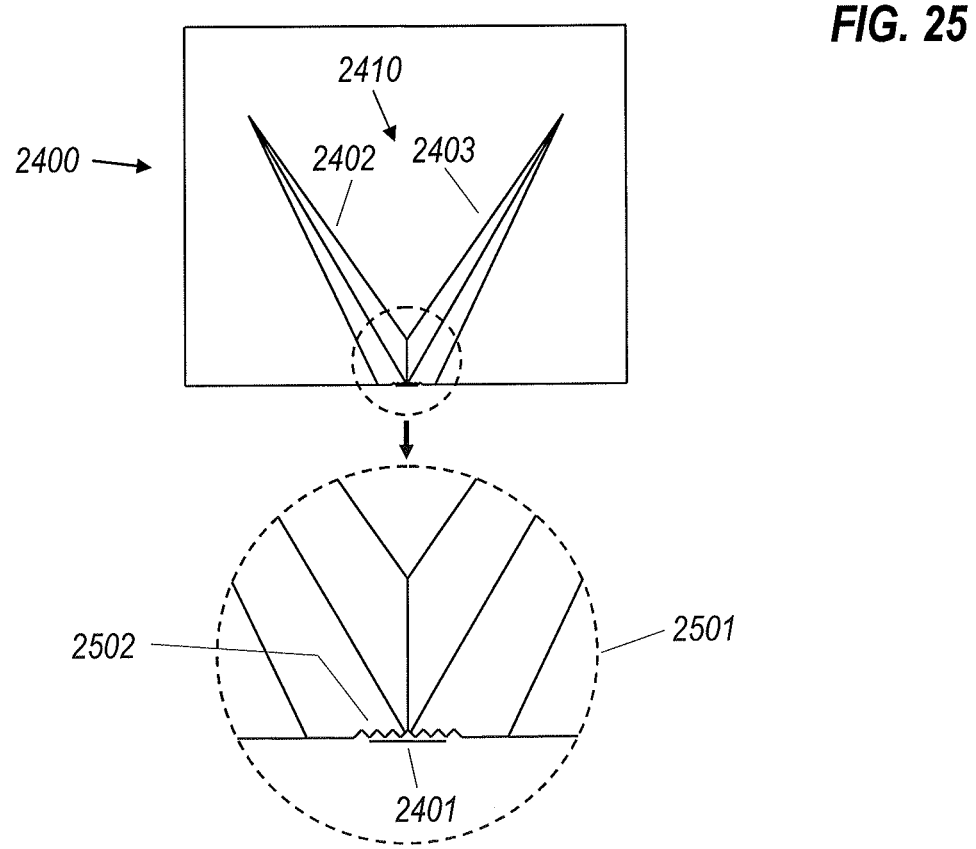
FIG. 25 shows a top view of the embodiment in FIG. 24.

FIGS. 24 and 25 show a 2 to 1 étendue-squeezing light injector 2400 comprising an étendue-squeezing optic 2410 (having a main body, two wedge protuberances and a W-groove entry structure) and an LED 2401, which is separated from optic 2410 by a narrow air gap. A fraction of the light emitted by LED 2401 is injected directly into the main body of optic 2410 while another fraction is injected into wedges 2402 and 2403 (both inverted V protuberances) that form part of the top surface of optic 2410. The two wedges 2402, 2403 diverge from the center of the entrance port facing the LED, where their center lines meet. In an embodiment, an angle of 60° between the centerlines of the two wedges 2402, 2403 was found to give the best result. In general, a wide variety of étendue squeezing ratios can be achieved by varying the ratio of thickness of the body of the étendue-squeezing optic 2410 and the height of the LED.

FIG. 25 shows a top view of the embodiment 2400 disclosed in FIG. 24. Inset 2501 details the coupling between LED 2401 and étendue-squeezing optic 2410. Light emitted by LED 2401 enters optic 2410 through its W-shaped linear grooves 2502. These act as a beam splitter, dividing the light into two beams, one directed towards wedge 2402 and the other towards wedge 2403. In an embodiment, a W-groove structure 2502 consisting of 90° vertical wedges was found to give good results.

The two wedges may be designed using parameters similar to those of the wedge 2304 of FIG. 23, in which case the geometrical transmission efficiency of this embodiment can also be above 90%.

Transmission losses due to absorption can be mitigated by using low absorptance materials such as cast acrylics, silicone or other materials used for solid dielectric light guides.

Figure 26:
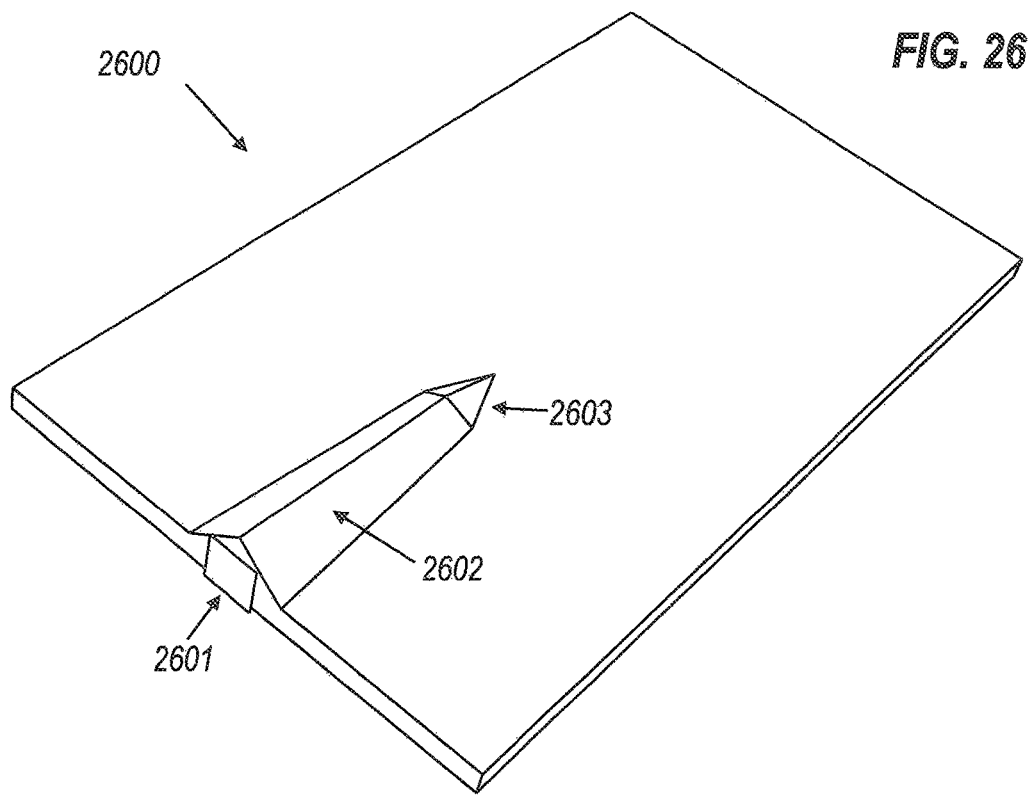
FIG. 26 shows a 2 to 1 étendue squeezing optic whose top surface has a two-stage inverted V protuberance.

FIG. 26 shows a 2 to 1 étendue-squeezing light injector 2600 comprising étendue-squeezing optic 2610, similar to étendue-squeezing optic 2310 of FIG. 23, and LED 2601, separated from optic 2610 by a narrow air gap. However, in optic 2610, its V-protuberance feature is made of two stages: first wedge 2602 and second wedge 2603. The geometry of these wedges (angles, length of each stage) must be optimized according to the application. The complete protuberance has a shape that resembles half of an obelisk. When compared with the embodiment of FIG. 23, this new configuration has the advantage that it can be of a significantly smaller size for the same efficiency.

If the aperture angle of first wedge 2602 is about 102° and the angle to the horizontal is about 4° (as with the embodiment in FIG. 23), and the aperture angle of second wedge 2603 is about 110° and its angle to the horizontal is approximately 17.5°, the geometrical transmission efficiency of the optic is above 90%. The largest efficiency losses come from the entry surface of wedge 2602 which does not collect all the light from LED 2601. Some light is also lost by failing TIR inside the light guide.

Figure 27:
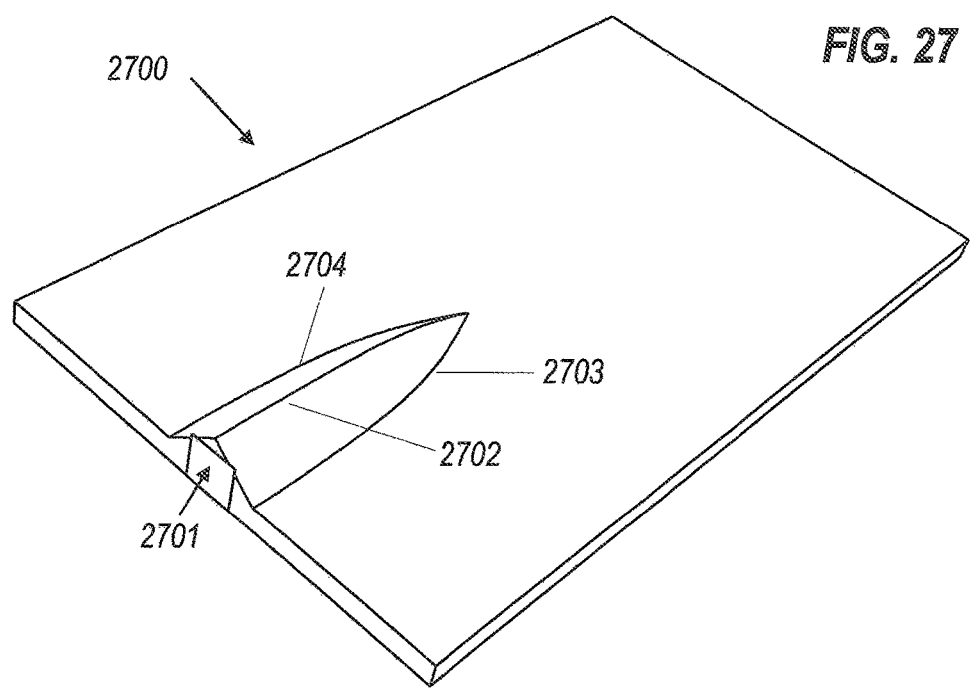
FIG. 27 shows a 2 to 1 étendue squeezing optic whose top surface has a curved inverted V protuberance.

FIG. 27 shows a 2 to 1 étendue-squeezing light injector 2700 comprising étendue-squeezing optic 2710 and LED 2701, separated from the optic 2710 by a narrow air gap. The inverted V protuberance feature of optic 2710 is now freeform and can be defined by curved profile 2702 of the angle along its top where the two sloped faces meet, and curved profile 2703 and curved profile 2704, respectively to the right and left, at its base where the sloped faces meet the flat top of the light guide. The aperture angle of the face of the inverted V protuberance is similar to first wedge 2602. The curved profiles 2702, 2703 and 2704 can be obtained by interpolation of the points of the obelisk shape of FIG. 26. However, further optimization is possible by taking advantage of the free-form shape of the wedge. That enables a high-efficiency optic with a compact protuberance. On the other hand, where the 90% geometrical efficiency of FIG. 26 is acceptable, the obelisk shape is much simpler to compute and analyze.

Figure 28:
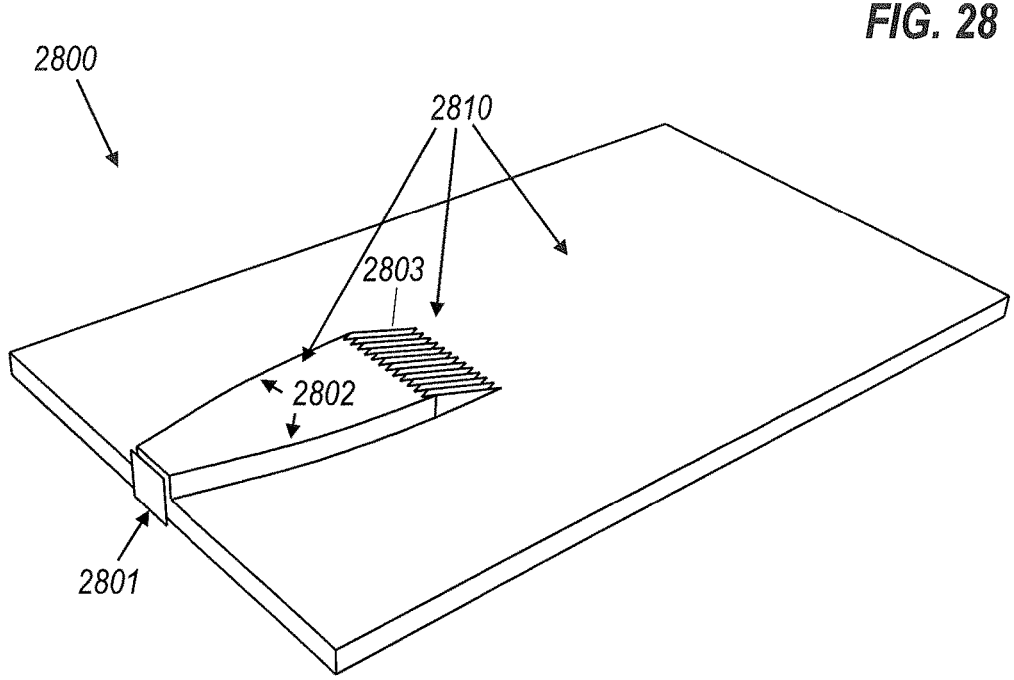
FIG. 28 shows a 2 to 1 étendue squeezing optic whose top surface has a (truncated) angle transformer and an array of V-grooves.

FIG. 28 shows 2 to 1 étendue-squeezing light injector 2800 comprising étendue-squeezing optic 2810 (having a main body with additional truncated angle transformer and linear V-groove features) and LED 2801, separated from the optic by a narrow air gap. A fraction of the emitted light of LED 2801 is injected directly into the main body of optic 2810 while another part is injected into its protuberance that projects from the top surface. This protuberance is shaped as a union of truncated angle transformer 2802 and array of linear V-grooves 2803. The transformer has its top surface parallel to its base, and acts to collimate the light only in the horizontal plane. The array of linear V-grooves is tilted with respect to the main top surface of optic 2810, and squeezes the light vertically into the main body of optic 2810 by broadening the fan again horizontally. As mentioned in discussing FIGS. 21 and 22, the V-groove array 2803 is most efficient when the light entering it has a narrow cone of angles. The collimated light from the transformer 2802 is thus very suitable.

If truncated angle transformer 2802 has an input angle (fan half width) equal to the critical angle inside a material of refractive index n=1.5, that is, an input angle of about ±42°, and has an exit angle of ±15°, and the V-grooves of the array of linear grooves 2803 have an aperture angle of about 110° and an angle to the horizontal of about 17.5°, the geometrical transmission efficiency of étendue-squeezing optic 2810 is above 90%. In this embodiment, the angle transformer is truncated at 73% of its ideal length. An angle transformer is an optic that accepts light with angular aperture θ1 and outputs light with angular aperture θ2 where θ2<θ1. One example is the compound parabolic concentrator (CPC). The side walls start at the aperture accepting light with angular aperture θ1 as straight sections which then continue up as parabolic sections (similarly to what happens in a CPC). A more detailed description may be found in Julio Chaves, "Introduction to Nonimaging Optics, Second Edition", CRC Press 2015. The embodiment of FIG. 28 may be advantageous in a configuration similar to FIG. 5, with an array of LEDs side by side along an entrance edge of a large light guide or backlight element, because the narrow shape of the truncated angle transformer 2802 allows multiple devices to be mounted close together.

Figure 29:
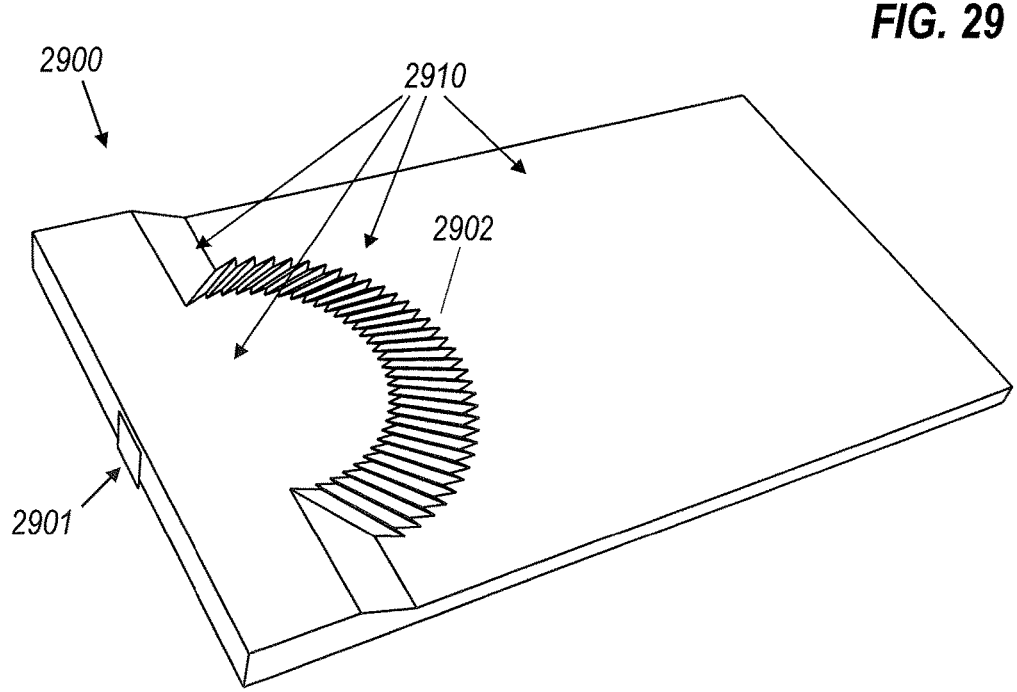
FIG. 29 shows a 2 to 1 étendue squeezing optic whose top surface has V-grooves that radiate from the LED.
Figure 30:
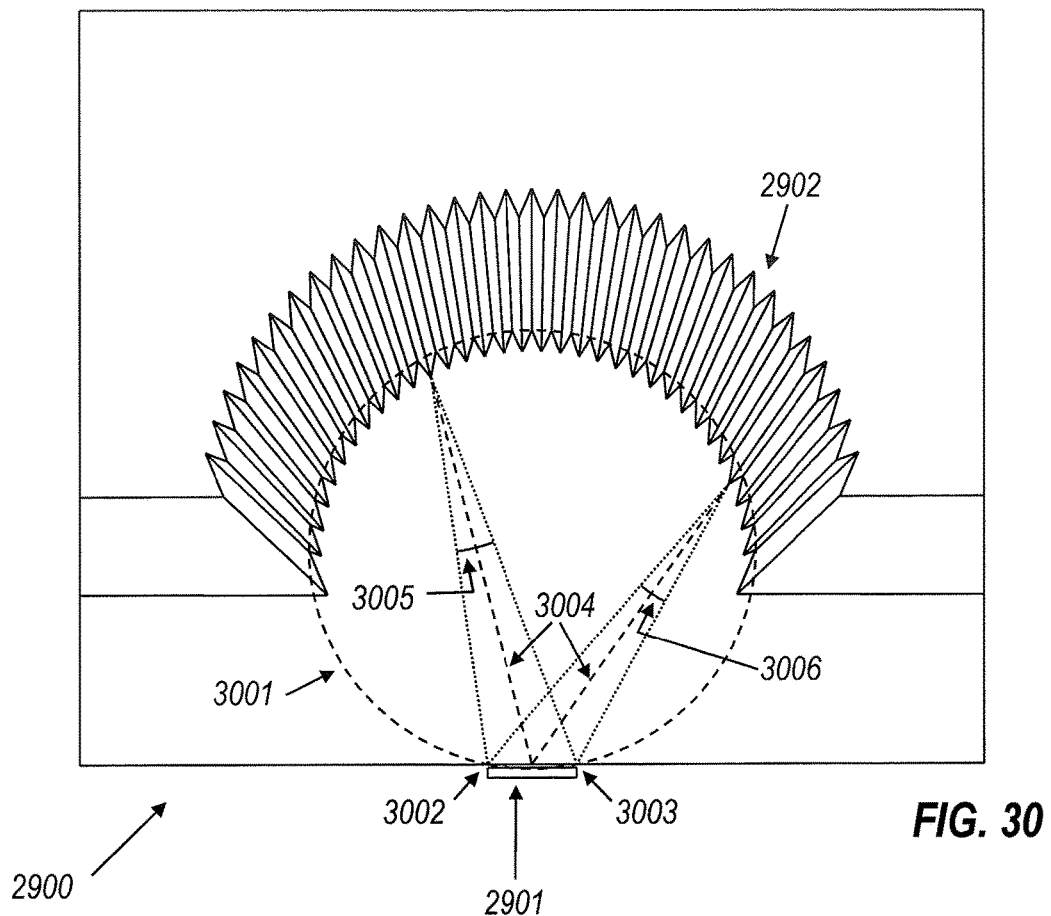
FIG. 30 shows a top view of the embodiment disclosed in FIG. 29.

Referring to FIGS. 29 and 30, a further 2 to 1 étendue-squeezing light injector 2900 comprises étendue-squeezing optic 2910 and LED 2901, the two being separated by a narrow air gap. Étendue-squeezing optic 2910 incorporates radial V-groove wedges 2902 on part of its top surface, which are tilted with respect to its horizontal plane.

FIG. 30 shows a top view of the embodiment of FIG. 29. Tilted V-groove wedges 2902 are aligned radially from the center of the LED 2901 as exemplified by dashed lines 3004.

However, their starting points are located on a circle 3001 the front side of which passes through the edges 3002 and 3003 of the entrance aperture where the light from LED 2901 enters the light guide. That is in contrast to Shinohara where, as shown by a dashed arc in FIG. 22, the starting points of the V-grooves are on a circle that has its center at the entrance aperture. The acceptance angles 3005 and 3006 of the V-grooves (which are the angle subtended by the entrance aperture at the starting point of each V-groove) are the same and constant all round circle 3001. That arrangement of the radial V-grooves enables a minimum footprint on the light guide while providing high efficiency, or at least a footprint that can be significantly reduced, compared with FIG. 21 and FIG. 22.

Figure 31:
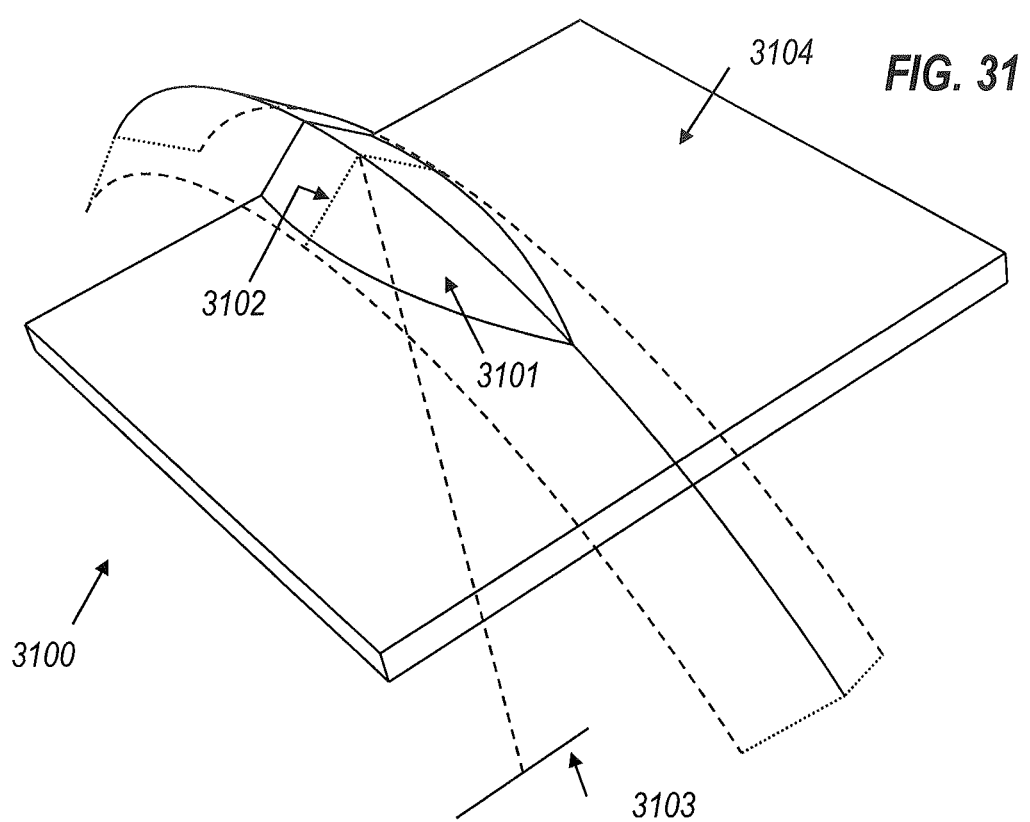
FIG. 31 shows an embodiment similar to that in FIG. 27, but now whose wedge walls have rotational symmetry.

FIG. 31 shows an étendue-squeezing optic embodiment similar to the optic 2710 in FIG. 27, but in this case the wedge walls have rotational symmetry. Optic 3100 is made of flat light guide 3104 with wedge 3101, whose side walls are obtained by rotation of profile 3102 around axis 3103. The rotational symmetry of wedge 3101 eases the making of the mold, but at the expense of a small drop in efficiency when compared to the embodiment in FIG. 27.

Although specific embodiments have been described, other configurations are possible, and the skilled person will understand how features of different embodiments may be combined. For example, in the interests of conciseness most embodiments have been described only for a 2 to 1 squeeze (from a square LED w×w to an exit port 2w×w/2). However, these embodiments can easily be applied to other squeeze ratios.

For example, the partitioning of the entrance aperture into a whole number of segments, each of which is the same height as the exit aperture, is highly recommended in the embodiments of FIGS. 1-20, because it avoids the need to change the height of any of the optical channels, and thus avoids changing the cone angle of the rays in the vertical direction, but is not essential. Indeed, there may be circumstances where increasing or decreasing the vertical collimation is actually desirable.

Accordingly, reference should be made to the appended claims, rather than to the foregoing specification, as indicating the scope of the invention. Aspects of the invention include combinations of the features of any two or more of the appended claims.

The invention claimed is:

1. An étendue-squeeze optic comprising:
    first and second luminance shifters of transparent material having a refractive index greater than that of air, having inlet ends that are coextensive and each of a first extent in a first direction and are each of a second extent in a second direction, the inlet ends of the luminance shifters forming parts of a common light inlet, and having outlet ends that are coextensive and of the second extent in the second direction and are each longer than the first extent in the first direction;
    wherein the common light inlet comprises a flat surface at which a critical angle of refraction determines a cone angle for rays propagating into the luminance shifters from the common light inlet;
    wherein one side of each of the first and second luminance shifters in the first direction comprises a convex surface shaped so that all rays reaching said one side within said cone angle directly from the common light inlet are reflected at said one side by total internal reflection, and wherein a side of each of the first and second luminance shifters opposite said one side comprises a region extruded outside all rays reaching said opposite side within said cone angle directly from the common light inlet;
    wherein at said outlet ends said one sides are closer together than said opposite sides.

2. The étendue-squeeze optic of claim 1, further comprising at least one third element having an inlet end that is coextensive with the inlet ends of the first and second luminance shifters in the first direction and is of the second extent in the second direction, the inlet end of the third element forming part of the common light inlet, and has an outlet end that is coextensive with the outlet ends of the first and second luminance shifters in the second direction and is between the outlet ends of the first and second luminance shifters in the first direction.

3. The étendue-squeeze optic of claim 1, wherein said first and second luminance shifters comprise first parts that diverge in the first direction and second parts that converge in the second direction.

4. The étendue-squeeze optic of claim 3, wherein said extruded regions extend at least from an interface between said first luminance shifter parts and said second luminance shifter parts to said outlet ends.

5. The étendue-squeeze optic of claim 1, wherein each of said extruded regions is bounded by a face parallel to the common light inlet and a face perpendicular to the common light inlet.

6. The étendue-squeeze optic of claim 5, wherein said faces parallel to the common light inlet are flush with the common light inlet.

7. The étendue-squeeze optic of claim 1, wherein the extruded regions of the first and second luminance shifters where no rays pass through and the outlet ends of the first and second luminance shifters are not aligned in the second direction.

8. The étendue-squeeze optic of claim 1, in combination with a flat light guide having a thickness equal to the second extent, wherein the outlet ends of the luminance shifters abut and are in optical communication with an edge of the flat light guide, and the faces of the extruded regions that are perpendicular to the common light inlet are flush with side edges of the flat light guide.

9. An étendue-squeeze light injector comprising the étendue-squeeze optic of claim 1 in combination with a light source optically coupled to the common light inlet through an air-gap, so that light entering the optic through the air-gap is confined to a cone of directions determined by a critical angle of refraction into the optic from air at the air-gap.

10. An étendue-squeeze optic comprising first and second luminance shifters, each having an inlet of height width W, forming part of a rectangular light inlet of height NH and width W, where N is a whole number greater than or equal to 2, and each having an outlet of height H and width greater than W, the outlets abutting an edge of a backlight element of thickness H and optically coupled to the edge of the backlight element,
    wherein each of the first and second luminance shifters comprises one side surface facing in the width direction that is convex outwards for at least part of its length and is shaped to reflect by total internal reflection light reaching the side surface directly from the inlet, and comprises an opposite side that is extruded in the width direction outside any ray entering the inlet by refraction;
    wherein at said outlet ends said one sides are closer together than said opposite sides; and wherein the height is dimension measured in a direction of the thickness of the backlight element and the width is dimension measured in a direction perpendicular to the thickness of the backlight element.

11. The étendue-squeeze optic of claim 10, wherein the convex surface comprises a surface that is an ellipse or parabola with a focus at the opposite side of the inlet.

12. The étendue-squeeze optic of claim 10, further comprising at least a third luminance shifter and a fourth luminance shifter, the inlets of which form part of a second rectangular light inlet, wherein the extruded side of one of the first and second luminance shifters is unitary with the extruded side of one of the third and fourth luminance shifters, and wherein the outlets of the third and fourth luminance shifters are also coupled to said edge of the backlight element.

13. The étendue-squeeze optic of claim 10, further comprising a light source optically coupled to the light inlet through an air-gap, so that light entering the optic through the air-gap is confined to a cone of directions determined by a critical angle of refraction into the optic from air at the air-gap.

14. The étendue-squeeze optic of claim 10, wherein at said extruded side of each of said luminance shifters said rays entering the inlet by refraction pass outside an imaginary side wall that would redirect the rays by total internal reflection to a part of the outlet end of width W starting from said one side of the respective luminance shifter.

15. An étendue-squeeze optic comprising:
an entrance surface of width W;
at least two luminance guides having respective inlets of width W and forming respective parts of the entrance surface in a height direction, the luminance guides extending in a length direction from respective parts of the entrance surface;
wherein at least one of the luminance guides comprises a transverse luminance shifter with flat top and bottom boundaries in the height direction, and an outwardly convex side boundary in the width direction, starting at one side of the entrance surface perpendicular to the entrance surface and curving in the width direction towards an opposite side, such that at an outlet end of the transverse luminance shifter remote from the inlets the at least two luminance guides do not overlap in the width direction;
wherein at least one of the luminance guides comprises a luminance height shifter with a flat boundary on said one side, and outwardly convex top and bottom boundaries in the height direction, one of said outwardly convex top and bottom boundaries starting aligned with one of the flat top and bottom boundaries of the transverse luminance shifter and the other of said outwardly convex top and bottom boundaries ending at an outlet end parallel to the flat top and bottom boundaries of the transverse luminance shifter, such that at the outlet ends of the luminance height shifters the luminance guides are aligned in the height direction, and of width at least W and not overlapping in the width direction;
and wherein two of the luminance guides that at the outlet ends are outermost in the width direction have side surfaces on the side of each that faces away from the other outermost luminance guide that are swept outwards in the width direction to form swept regions such that the two outermost luminance guides in combination have a width at the outlet end greater than width W at the entrance surface, and light rays reaching the swept regions are permitted to diverge in the width direction.

16. The étendue-squeezing optic of claim 15, wherein the swept regions each have a length in the length direction (i) that is substantially the same as the length of each of the luminance height shifters or (ii) that extends substantially the whole length of the luminance guides.

17. The étendue-squeezing optic of claim 15, wherein at least one of the luminance guides is substantially straight and parallel sided.

18. The étendue-squeeze optic of claim 15, further comprising a light source optically coupled to the entrance surface through an air-gap, so that light entering the optic through the air-gap is confined to a cone of directions determined by a critical angle of refraction into the optic from air at the air-gap.

19. An étendue-squeeze optic comprising a flat light guide having a thickness in a first direction; an optic injector with a light inlet at one end of the optic injector and spaced apart from the light guide, the light inlet having a width in the first direction greater than the thickness of the light guide; the optic injector including a first portion and a second portion, the first portion including curved surfaces that extend in a length and width direction toward the light guide for collimating a portion of light entering the light inlet, the second portion extending parallel to the first portion for permitting a portion of light entering the light inlet to pass to the light guide, the first portion of the optic injector having at an end remote from the light inlet an array of V-grooves sloping into the second portion.

20. The étendue-squeeze optic of claim 19, in combination with a light source optically coupled to the light inlet through an air-gap, so that light entering the optic through the air-gap is confined to a cone of directions determined by a critical angle of refraction into the optic from air at the air-gap.

21. An étendue-squeeze optic comprising:
first and second luminance shifters of transparent material having a refractive index greater than that of air, having inlet ends that are each of a first extent in a first direction and are each of a second extent in a second direction and are aligned in the second direction, the inlet ends of the luminance shifters forming parts of a common light inlet, and having outlet ends that are aligned in the first direction and each have an extent in the second direction that is the same as the second extent and each have an extent in the first direction that is longer than the first extent;
wherein the common light inlet comprises a flat surface at which a critical angle of refraction determines a cone angle for rays propagating into the luminance shifters from the common light inlet;
wherein one side of each of the first and second luminance shifters in the first direction comprises a convex surface shaped so that all rays reaching said one side within said cone angle directly from the common light inlet are reflected at said one side by total internal reflection, and wherein a portion of the first and second luminance shifters spaced apart from said one side defines a region where no rays from the common light inlet pass through;
wherein at said outlet ends said one sides are closer together than said opposite sides.

* * * * *